United States Patent
Ma

(10) Patent No.: US 9,628,747 B2
(45) Date of Patent: Apr. 18, 2017

(54) IMAGE SCROLLING ON A PHOTO SHARING DEVICE DISPLAY

(71) Applicant: LYVE MINDS, INC., Cupertino, CA (US)

(72) Inventor: Jeff Ma, Cupertino, CA (US)

(73) Assignee: LYVE MINDS, INC., Cupertino, CA (US)

( * ) Notice: Subject to any disclaimer, the term of this patent is extended or adjusted under 35 U.S.C. 154(b) by 0 days.

(21) Appl. No.: 14/708,998

(22) Filed: May 11, 2015

(65) Prior Publication Data

US 2015/0326818 A1    Nov. 12, 2015

Related U.S. Application Data

(60) Provisional application No. 61/991,246, filed on May 9, 2014.

(51) Int. Cl.
| | | |
|---|---|---|
| H04N 9/80 | (2006.01) | |
| H04N 5/765 | (2006.01) | |
| H04N 5/93 | (2006.01) | |
| H04N 21/218 | (2011.01) | |
| H04N 21/436 | (2011.01) | |

(52) U.S. Cl.
CPC ........... *H04N 5/765* (2013.01); *H04N 5/93* (2013.01); *H04N 5/9305* (2013.01); *H04N 21/218* (2013.01); *H04N 21/21815* (2013.01); *H04N 21/43615* (2013.01)

(58) Field of Classification Search
None
See application file for complete search history.

(56) References Cited

U.S. PATENT DOCUMENTS

| | | |
|---|---|---|
| 2001/0043194 A1 | 11/2001 | Amron |
| 2006/0082600 A1 | 4/2006 | Odagawa |
| 2009/0309901 A1 | 12/2009 | Jho |
| 2011/0035694 A1 | 2/2011 | Tsai et al. |
| 2012/0108293 A1 | 5/2012 | Law et al. |
| 2012/0127196 A1 | 5/2012 | Landry |

(Continued)

FOREIGN PATENT DOCUMENTS

WO     2006/052390 A9     7/2007

OTHER PUBLICATIONS

International Search Report dated Aug. 7, 2015 as received in Application No. PCT/US2015/030203.

(Continued)

*Primary Examiner* — Heather Jones
(74) *Attorney, Agent, or Firm* — Schwegman, Lundberg & Woessner, P.A.

(57) ABSTRACT

Systems and methods are disclosed to retrieve a first plurality of images from a local storage location at an electronic device; display each image of the first plurality of images on a display of the electronic device with a first transition between consecutively displayed images of the first plurality of images; receive a second plurality of images from a remote storage location through a communication interface of the electronic device; and display each image of the second plurality of images on the display of the electronic device with a second transition between consecutively displayed images of the second plurality of images, wherein the second transition is different than the first transition.

20 Claims, 10 Drawing Sheets

(56) References Cited

U.S. PATENT DOCUMENTS

2012/0182325 A1 7/2012 Hayashi
2012/0249575 A1* 10/2012 Krolczyk ............... G06F 3/147
 345/619
2013/0081083 A1 3/2013 Yu et al.

OTHER PUBLICATIONS

Written Opinion of the International Searching Authority dated Aug. 7, 2015 as received in Application No. PCT/US2015/030203.
TW Office Action dated Jun. 7, 2016 as received in Application No. 104114920 (English Translation).
TW Search Report dated Jun. 4, 2016 as received in Application No. 104114920 (English Translation).

* cited by examiner

IMAGE SCROLLING ON A PHOTO SHARING DEVICE DISPLAY

FIELD

This disclosure relates generally to image scrolling on a display.

BACKGROUND

The amount of personal data (e.g., photos, video, documents, etc.) is increasing such that different methods and systems for storing personal data are also increasing. However, many methods and systems of storing personal data may present challenges such as being cumbersome and time consuming, providing inadequate redundancy, and not allowing for easy accessibility of the data on different devices, among other things.

SUMMARY

Embodiments of the invention include a method for retrieving a first plurality of images from a local storage location at an electronic device; displaying each image of the first plurality of images on a display of the electronic device with a first transition between consecutively displayed images of the first plurality of images; receiving a second plurality of images from a remote storage location through a communication interface of the electronic device; and displaying each image of the second plurality of images on the display of the electronic device with a second transition between consecutively displayed images of the second plurality of images, wherein the second transition is different than the first transition.

In some embodiments, the first transition may include displaying each image of the first plurality of images in motion moving from a first side of the display to a second side of the display. The second transition may include displaying each image of the second plurality of images in motion moving from the second side of the display to the first side of the display.

In some embodiments, the first transition may include displaying each image of the first plurality of images in motion at a first rate. The second transition may include displaying each image of the second plurality of images in motion at a second rate that is faster than the first rate.

In some embodiments, the communication interface may be a USB connection, a network connection, a Bluetooth interface, and a Wi-Fi interface.

In some embodiments, the second plurality of images may include a subset of a plurality of images being received from the remote storage location through a communication interface of the electronic device. In some embodiments, the first transition may include displaying each image of the first plurality of images in motion. In some embodiments, each image of the first plurality of images may be displayed without being in motion for a set period of time.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to display images on a display differently based on whether the images are stored locally within an electronic device or whether the images are being received from a remote storage location. The images stored locally, for example, may be displayed in any number of ways based on any number of factors. Moreover, the images that are stored locally may be displayed one after another using a first transition between images. The images that are being received from a remote storage location, on the other hand, may be displayed one after another using a second transition between the images that is different than the first transition. The second transition, for example, may include moving images downwardly along the display area. In some embodiments, the images may be thumbnail images of an image or a video.

With the advent of smartphones having cameras, image and photograph management has become increasingly acute. The sheer number of photographs taken by users can be staggering making it difficult for users to view and enjoy previously taken photographs. Embodiments of the invention seek to solve this problem using an image display hub that displays images in specific ways depending on the source of the image. Embodiments of the invention require computer technology to search and display images in a specific way depending on the source of the images.

Figure 1A:
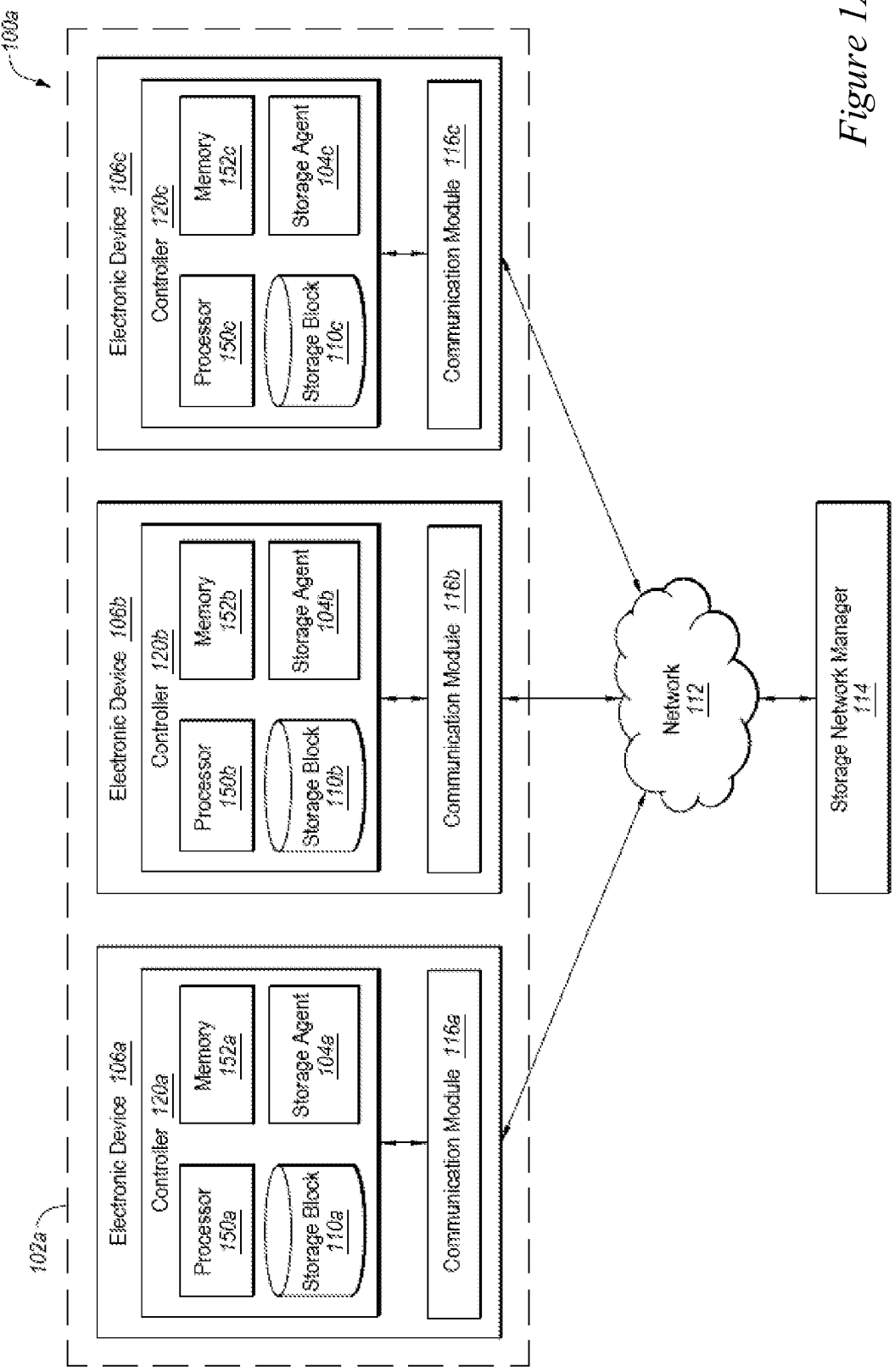
FIG. 1A illustrates an example storage system configured to allocate data to storage blocks included in a storage network.

Embodiments described herein may be used in an image storage system such as, for example, the storage system shown in FIG. 1A. FIG. 1A illustrates a block diagram of an example storage system 100a configured to allocate data to storage blocks 110 included in a storage network 102a, according to at least one embodiment of the present disclosure. The storage network 102a may include storage blocks 110a-110c, which may be included in electronic devices 106a-106c (also referred to herein as "devices" 106), respectively. The management of storage of the data on the storage blocks 110 may be performed by the one or more storage agents 104. In the illustrated embodiment, the storage system 100a is depicted as including storage agents 104a-104c, where the devices 106a-106c respectively include the storage agents 104a-104c. Although the storage system 100a is illustrated as including a single storage network 102a with three different storage blocks 110, the storage agents 104 and the devices 106 associated therewith, the storage system 100a may include any number of storage networks that may each include any number of the storage blocks 110, the storage agents 104, and the devices 106. Additionally, one or more of the devices 106 may include more than one storage agent 104 and/or the storage block 110, in some embodiments.

In some embodiments, the storage system 100a may be configured to store, organize, and/or manage data files such as photos, videos, documents, etc. In some embodiments, the data files may be included in data objects that may also include metadata that may provide information about the data files. The term "data" in the present disclosure may refer to any suitable information that may be stored by the storage blocks 110 and may include one or more data files, metadata, or any combination thereof.

The storage system 100a may be configured to organize and manage the data stored across the storage blocks 110a-110c in an automated fashion that may reduce an amount of input required by a user. Additionally, the storage system 100a may be configured such that data stored on the particular storage block 110 may be accessed and used by the devices 106 that do not include the particular storage block 110. As such, the storage system 100a may facilitate organization of the data stored by the storage blocks 110 and managed by the storage agents 104 within the storage network 102a as well as provide access to the data, regardless of whether the data is stored on the storage block 110 local to the particular device 106.

The devices 106 may be any electronic device that may include the one or more storage blocks 110. The devices 106 may be configured to store data to or access data from their associated storage blocks 110. By way of example, the devices 106 may be any one of a cloud storage server, a mobile phone, a tablet computer, a desktop computer, a laptop computer, a camera, a personal digital assistant (PDA), a smartphone, a music player, a video player, an external hard drive, etc.

In some embodiments, the devices 106 may also include a controller 120, which may each include a processor 150, a memory 152, and the storage block 110. Additionally, the controllers 120 may each include the one or more storage agents 104 that may be configured to manage the storage of data on the storage blocks 110 and the interaction of the devices 106 and the storage blocks 110 with the storage network 102a. By way of example, in the illustrated embodiment, the device 106a may include a controller 120a that includes a storage agent 104a, a processor 150a, a memory 152a, and a storage block 110a; the device 106b may include a controller 120b that includes a storage agent 104b, a processor 150b, a memory 152b, and a storage block 110b; and the device 106c may include a controller 120c that includes a storage agent 104c, a processor 150c, a memory 152c, and a storage block 110c.

The processors 150 may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data. In some embodiments, the processors 150 may interpret and/or execute program instructions and/or process data stored in their associated memory 152 and/or one or more of the storage blocks 110.

The memories 152 may include any suitable computer-readable media configured to retain program instructions and/or data for a period of time. By way of example, and not limitation, such computer-readable media may include tangible and/or non-transitory computer-readable storage media, including Random Access Memory (RAM), Read-Only Memory (ROM), Electrically Erasable Programmable Read-Only Memory (EEPROM), Compact Disk Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by the processors 150. Combinations of the above may also be included within the scope of computer-readable media. Computer-executable instructions may include, for example, instructions and data that cause a general-purpose computer, special-purpose computer, or special-purpose processing device (e.g., the processors 150) to perform a certain function or group of functions. In some embodiments, the storage agents 104 may be stored as computer-executable instructions inside of the memory 152 of their respective device 106.

The storage blocks 110 may also be any suitable computer-readable medium configured to store data. The storage blocks 110 may store data that may be substantially the same across the different storage blocks 110 and may also store data that may only be found on the particular storage block 110. Although each device 106 is depicted as including a single storage block 110, the devices 106 may include any number of the storage blocks 110 of any suitable type of computer-readable medium. For example, the device 106 may include a first storage block 110 that is a hard disk drive and a second storage block 110 that is a flash disk drive. Further, the storage block 110 may include more than one type of computer-readable medium. For example, the storage block 110 may include a hard disk drive and a flash drive. Additionally, the storage block 110 may be removable from the device 106 such that it may be included with more than one device 106 at different times. For example, the storage block 110 may be a Universal Serial Bus (USB) storage device or a Secure Digital (SD) card that may be connected to the different devices 106 at different times.

As mentioned above, the storage agents 104 may be configured to manage the storage of data on the storage blocks 110 with respect to the storage network 102a. In some embodiments and as indicated above, one or more of the storage agents 104 may be included with any suitable device 106. Additionally, in some embodiments, the device 106 may not include the storage agent 104. In these and other embodiments, the one or more storage agents 104 included on the one or more other devices 106 may be configured to manage the data on the storage block 110 of the device 106 that may not include a storage agent. For example, in some embodiments, the particular storage block 110 may be included in the particular device 106 that is a cloud server managed by a third party. In some of these instances, the one or more storage agents 104 of the other devices 106 may be configured to manage the storage of data on the particular storage block 110 that is part of the particular device 106.

Additionally, the particular storage block 110 may be a portable storage element such as a USB memory stick that may be coupled with the different devices 106 at different times such that the different storage agents 104 may manage the particular storage block 110 at different times. For example, in some instances the particular storage block 110 may be coupled to the device 106a at one point in time such that the storage agent 104a may manage the particular storage block 110. Further, at a different time, the particular storage block 110 may be coupled to the device 106b such that the storage agent 104b may manage the particular storage block 110.

The devices 106 may each include a communication module 116 that may provide connectivity between the devices 106 to allow for communication of data between the storage blocks 110 and the storage agents 104. For example, the device 106a may include a communication module 116a, the device 106b may include a communication module 116b, and the device 106c may include a communication module 116c.

The communication modules 116 may provide any suitable form of communication capability between the devices 106. By way of example and not limitation, the communication modules 116 may be configured to provide, via wired and/or wireless mechanisms, Internet connectivity, Local Area Network (LAN) connectivity, Wide Area Network (WAN) connectivity, Bluetooth connectivity, 3G connectivity, 4G connectivity, LTE connectivity, Wireless Fidelity (Wi-Fi) connectivity, Machine-to-Machine (M2M) connectivity, Device-to-Device (D2D) connectivity, any other suitable communication capability, or any suitable combination thereof.

In the illustrated embodiment, the communication modules 116 are depicted as providing connectivity between the devices 106 via a communication network 112 (referred to hereinafter as "network 112"). In some embodiments, the network 112 may include, either alone or in any suitable combination, the Internet, an Intranet, a local Wi-Fi network, a wireless LAN, a mobile network (e.g., a 3G, 4G, and/or LTE network), a LAN, a WAN, or any other suitable communication network. Although not expressly depicted in FIG. 1, in these and other embodiments, the communication modules 116 may provide direct connectivity between the devices 106.

The communication of data stored on the storage blocks 110 between the devices 106 may accordingly allow for the devices 106 to access and use data that may not be stored locally on their associated storage blocks 110. The storage agents 104 may be configured to facilitate such coordination and communication of data between the devices 106. As such, the storage network 102a, the devices 106, the storage agents 104, and the storage blocks 110 may allow for storage of data while also allowing the devices 106 access to the stored data even when the data is not locally stored on the storage blocks 110 included in the particular devices 106. Additionally, the communication of data between the devices 106 and associated coordination by the storage agents 104 may facilitate providing redundancy of the data such that storage blocks may be added to and removed from the storage network 102a with little to no loss of the data in the storage network 102a.

In some embodiments, the devices 106 may act similar to clients or servers included in an object-based file system. For instance, some devices 106 may be configured to store only metadata associated with various data objects, while the other devices 106 may be configured to store metadata and actual data files associated with the various data objects.

In some embodiments, to manage and provide information related to the storage of data in the storage network 102a, a catalog of data may be generated and managed for the storage network 102a. For example, in some embodiments, the catalog may include information such as which storage blocks 110 may be locally storing data objects, individual data files, and/or metadata. In some embodiments, the catalog may include a collection of all the metadata of the data objects stored in the storage network 102a. Accordingly, the catalog may be used to determine which storage block 110 has certain data stored thereon. As such, the devices 106 may know from where to access data if the data is not stored locally on their respective storage blocks 110. In some embodiments, the catalog may be stored by and synchronized between each of the storage blocks 110 based on synchronizations that may be managed by the storage agents 104.

In some embodiments, the storage agents 104 may be configured to communicate with one or more storage network controllers that may be referred to individually or collectively as a storage manager device 114. The storage manager device 114 may act similar to a central server in a distributed storage system. The storage manager device 114 may be associated with a server operated by a third-party providing storage management services or may be locally stored on the device 106 owned and/or managed by a user whose data is stored in the storage network 102a.

The storage manager device 114 may perform multiple functions in the storage system 100a, such as coordinating actions of the storage agents 104. For example, the functions of the storage manager device 114 may include, but are not limited to, locating data files among the storage blocks 110 of the storage network 102a, coordinating synchronization of data between the storage blocks 110 as performed by the storage agents 104, allocating storage of data on the storage blocks 110, and coordinating distribution of the data to the storage blocks 110. The allocation and distribution of data between the storage blocks 110 is described in further detail below.

In some embodiments, the storage manager device 114 may be included in the device 106 that is local to a user of the storage network 102a and, in other embodiments, the storage manager device 114 may be included in the device 106 that is managed by a third-party. In some embodiments, the storage manager device 114 may perform operations such that the storage manager device 114 may act as and be a storage agent (e.g., a storage hub). For example, the storage manager device 114 may manage data such as the catalog and/or other metadata associated with the storage network 102a and may synchronize this data with the other storage agents 104 such that the storage manager device 114 may act as a storage agent with respect to such data.

In some embodiments the storage manager device 114 may communicate with the storage agents 104 via the network 112 (as illustrated in FIG. 1A). The storage manager device 114 may also be configured to communicate with one or more of the storage agents 104 via a direct communication.

Metadata associated with the data included in the storage network 102a (e.g., the catalog described above) may include information regarding the status of the data, which may assist in locating data files, coordinating synchronization of data, allocating the data among the storage blocks 110, and determining a distribution strategy for allocated data, among other things. The status may indicate which data files may be allocated to which storage blocks 110, the distribution strategy associated with the different data files, when a transfer of data between the storage blocks 110 has started, that a transfer of data between the storage blocks 110 is ongoing, that a transfer of data between the storage blocks 110 stopped before the data was completely transferred, and whether particular data is still stored on the storage block 110.

In some embodiments, the storage manager device 114 may communicate instructions to the storage agents 104 regarding storage of the data such as the allocation and distribution of the data with respect to the storage blocks 110. The storage agents 104 may act in response to the instructions communicated from the storage manager device 114 such that the data may be stored on the storage blocks 110 according to the allocation and distribution. Additionally, in some embodiments, metadata communicated to and used by the storage manager device 114 may be such that the storage manager device 114 may know information about the associated data files (e.g., size, type, unique identifiers, location, etc.) stored in the storage network 102a, but may not know information about the actual content of the data files stored in the storage network 102a.

The storage agents 104 may locate data files within the storage network 102a according to metadata that may be stored on each of the storage agents 104. In some embodiments, such metadata may be stored as the catalog described above. For example, the storage agent 104a may locate a data file stored on the storage block 110b using the catalog stored on the storage block 110a and managed by the storage agent 104a. Some or all of the information for the storage agents 104 to locate data files stored on the storage network 102a may be communicated during synchronization of metadata performed by the storage agents 104 and/or the particular storage agent 104 and the storage manager device 114. Additionally or alternatively, the storage agents 104 may communicate with the storage) manager device 114 to locate data files stored on the storage network 102a.

Additionally, the storage manager device 114 may communicate with one or more of the storage agents 104 with unreliable, nonexistent, or intermittent connectivity with the other storage agents 104. As such, the storage manager device 114 may be configured to relay information received from the one storage agent 104 to another storage agent 104 to maintain the communication of data between the storage agents 104. For example, the storage agent 104c may be communicatively coupled to the storage agent 104b and/or the storage agent 104a using an unreliable or intermittent connection. The storage manager device 114 may accordingly communicate with the storage agent 104c via the network 112, and may then relay information from the storage agent 104c to the storage agent 104b and/or the storage agent 104a.

The storage manager device 114 may also be configured to determine a presence of the devices 106 and/or the storage blocks 110 within the storage network 102a. The presence of the devices 106 or the storage blocks 110 may indicate which devices 106 are communicatively coupled with another device 106 of the storage network 102a and/or with the storage manager device 114, thus indicating which devices 106 and the associated storage blocks 110 are "present" within or connected to the storage network 102a. The presence of the devices 106 and their associated storage blocks 110 may indicate the availability of the storage blocks 110 with respect to the storage network, which may be used for data allocation and distribution determinations as detailed below.

As mentioned above, the storage manager device 114 may be configured to determine an allocation of data files for storage on the storage blocks 110. In some embodiments, the storage manager device 114 may be configured to determine the allocation of data files for storage on the storage blocks 110 according to a desired redundancy for the data files and/or a desired availability of the data files. In some embodiments, the storage manager device 114 may determine the allocation to the particular storage block 110 based on multiple characteristics associated with the particular storage block 110. The characteristics may be related to the particular storage block 110 directly (referred to as storage block characteristics) and/or related to the device(s) 106 with which the particular storage block 110 may be associated (referred to as device characteristics).

For example, the storage manager device 114 may determine the allocation based on storage capacity of the particular storage block 110, available storage space of the particular storage block 110, storage element type of the particular storage block 110 (referred to hereinafter as "storage block type"), likelihood of loss of the particular storage block 110, availability of the particular storage block 110 with respect to the storage network 102a, the device 106 with which the particular storage block 110 is associated, health of the storage block, and/or use of the particular storage block 110.

The storage block type may influence one or more other storage block characteristics. For example, the storage block 110 that is a portable and removable storage block, such as a USB memory stick, may have a relatively high likelihood of loss of its data because it may be relatively easy to lose. Additionally, the storage use of a portable and removable storage block may be different than that of a permanently affixed storage block such as a hard disk drive of a desktop computer. Further, a portable and removable storage block may be less available with respect to the storage network 102a because at times it may not be associated with any device 106 such that the data stored thereon may not be available to the devices 106 of the storage network 102a.

Additionally, as detailed below, the particular device 106 with which the particular storage block 110 may be included may influence one or more other characteristics associated with the particular storage block 110 as detailed below. Accordingly, the device characteristics may influence the allocation and distribution of data as described below. In some embodiments, the storage manager device 114 may perform the allocation as the characteristics associated with the storage blocks 110 may relate to the desired redundancy and/or availability of the data files.

Device type is a device characteristic that may influence other characteristics associated with the storage blocks 110 that may influence data allocation. The device types may refer to generic categories of devices as well as specific types or models that may be included in the same generic category. By way of example, in the illustrated embodiment, the device 106a may be a first device type (e.g., a smartphone), the device 106b may be a second device type (e.g., an external hard drive), and the device 106c may be a third device type (e.g., a tablet). The device type may also refer to different models of a more generic device type. For example, a device type may be an iPhone® and another device type may be an Android® phone, even though both may also be characterized generically as smartphones. In some embodiments, the device type may be even more specific such as one device type may be an iPhone® 4 and another device type may be an iPhone® 5.

As indicated above, the types of the devices 106 may relate to one or more device characteristics of the devices 106, which may also be closely related to and/or overlap with storage block characteristics. For example, the device characteristics may include, but are not limited to, storage capacity of their respective storage blocks 110, available storage space of their respective storage blocks 110, removability of their respective storage blocks 110, reliability, likelihood of loss of data stored on their respective storage blocks 110, use of the devices 106 (and consequently of their respective storage blocks 110), physical location of the devices 106, location of the devices 106 with respect to each other, on/off status of the devices 106 (current and/or historical), and health of the devices 106. Additionally, the device characteristics may include the connectivity of the devices 106, such as the bandwidth of their respective connections, the network type (e.g., Wi-Fi, cellular, LAN,) used to connect with other devices 106 as well as the network 112, the connection type (e.g., wireless, wired), connectivity with other devices 106, latency (current and/or historical) of the devices 106 with respect to transfers of data, speed (current and historical) of transfers of data by the devices 106, monetary cost of the connectivity, etc.

As mentioned above, many device characteristics and/or storage block characteristics may relate to the types of the devices 106. For example, some devices 106 may be able to read, write, and/or access data faster than other devices 106 depending on the device type. The device characteristics may be related to a more generic device type (e.g., a smartphone versus a tablet) or a more specific device type (e.g., an iPhone® 4 versus an iPhone® 5).

By way of example, in some embodiments, the device 106a may be a smartphone and the device 106c may be an external hard drive. As a result, the storage capacity of the storage block 110a may be less than the storage capacity of the storage block 110c. Further, in this example, the storage block 110a of the device 106a may include flash memory and the storage block 110c of the device 106c may include a hard disk drive, which may have different levels of reliability as compared to solid state memory. Additionally, the likelihood of loss of the device 106a as a smartphone via the device 106a being lost, left, dropped, stolen, water damaged, etc. may be greater than the likelihood of loss of the device 106c as an external hard drive.

Also, the device 106a as a smartphone may be used by a user to access media type files such as pictures, music, and video, while the device 106c as an external hard drive may be used primarily by the user as a backup of data, but may not be used often to access the data. Accordingly, the use of the devices 106a and the storage agent 104c and their respective storage blocks 110a and 110c may also be based on the device types of the devices 106a and the storage agent 104c. Additionally, the device 106a as a smartphone may be carried by the user of the device 106a in a manner that the device 106a (and its associated components such as the storage agent 104a and the storage block 110a) may have inconsistent, low speed, and/or expensive connectivity to other devices 106 (and their associated components) of the storage network 102a. In contrast, the device 106c as an external hard drive (and its associated components) may have more consistent connectivity if the device 106c is constantly connected to at least the network 112.

As another example, the device types may also affect the locations of the devices 106. For example, a desktop computer may be in the same location a lot more often than a smartphone or a tablet is in the same location. Additionally, a desktop computer at a user's home may be likely to come into contact with the other devices 106 of the storage network 102a (e.g., smartphones, tablets, etc.) on a fairly consistent basis due to at least many of the other devices 106 likely being in the user's home at one time or another. Accordingly, the device type may also relate to the location of the particular device 106 with respect to another device 106.

The storage manager device 114 may be configured to determine the storage block characteristics of the storage blocks 110 and may allocate data to the storage blocks 110 based on the storage block characteristics. In some embodiments, the storage manager device 114 may be configured to determine the storage block characteristics based on the devices 106 with which the storage blocks 110 are associated. For example, the storage manager device 114 may be configured to determine the device types of the devices 106 and to determine one or more storage block characteristics and device characteristics based on the device types. Based on the determined characteristics, the storage manager device 114 may allocate data to the associated storage blocks 110.

For example, the device 106a may be a smartphone, which may be determined by the storage manager device 114. The storage manager device 114 may also determine storage block and device characteristics for the device 106a based on the device 106a being a smartphone. For example, the storage manager device 114 may determine storage block and device characteristics that include, but are not limited to, a likelihood of loss of the device 106a and the storage block 110a, reliability of the device 106a, storage capacity of the storage block 110a, available storage space on the storage block 110a, connectivity of the device 106a with the devices 106b and 106c, and use of the device 106a. The storage manager device 114 may accordingly allocate data to the storage block 110a as that data may relate to one or more of the device characteristics of the device 106a and storage block characteristics of the storage block 110a.

For instance, as mentioned above, the likelihood of loss of the device 106a as a smartphone may be relatively high compared to other device types. The storage manager device 114 may accordingly allocate data to the storage block 110a that may also be allocated to the other storage blocks 110 associated with other devices 106 such that if the device 106a is lost, the data stored on the storage block 110a may not be lost. Additionally, the storage capacity of the storage block 110a (and thus the device 106a) may be somewhat limited such that the storage manager device 114 may select a subset of the data stored in the storage network 102a to be stored on the storage block 110a of the device 106a, whereas the storage capacity of the other storage blocks 110 may be such that they may be able to store all of the data stored in the storage network 102a. Also, because users often use smartphones for viewing pictures and videos, as well as listening to music, in these and other embodiments, the storage manager device 114 may allocate data of this type to be stored on the storage block 110a due to the use of the device 106a and the storage block 110a.

Additionally, due to its nature, the device 106a (and consequently the storage agent 104a) as a smartphone may have sporadic, slow, and/or expensive (e.g., via a cellular network and associated data plan) connectivity with the other devices 106 and their associated storage blocks 110 of the storage network 102a. As such, the availability of the storage block 110a and its associated data with respect to the storage network 102a may be somewhat limited. Accordingly, the storage manager device 114 may allocate data to the storage block 110a that may be used more often by the device 106a such that the device 106a may not need to rely on connectivity with the other devices 106 and their associated storage blocks 110 to access the data. Further, the storage manager device 114 may not allocate data to the storage block 110 where the other devices 106 may rely on accessing the data from the storage block 110a because of the reduced availability of the storage block 110a.

As another example, in some embodiments, the device 106c and the storage block 110c may be associated with a glacial storage system. A glacial storage system may be associated with any type of storage scheme that may have significant latencies (e.g., in the order of minutes or even hours) with respect to storing and/or accessing data stored thereon, but that may be fairly reliable. Many times a glacial storage system may be part of a cloud storage service where the storage blocks of the glacial storage system may be offline (e.g., turned off, stored apart from a computing device) and may need to be placed online before data can be stored thereon or accessed therefrom. The storage manager device 114 may allocate data that may not be accessed often to the storage block 110c associated with a glacial storage system such that the latency may be less of an issue than if the data were accessed more often, which may also free up storage space on the storage blocks 110 that may not have such latencies. Additionally, the storage manager device 114 may allocate large portions (if not all) of the data stored in the storage network 102a to the storage block 110c such that the storage block 110c may be used as a backup for data due to the reliable nature of glacial storage systems.

As another example, the particular device 106 may be able to download and/or upload data at a relatively high rate because of the bandwidth of its connections with the network 112 and/or the other devices 106. Accordingly, data with a high likelihood of use may be allocated to the storage block 110 associated with the particular device 106 having the high bandwidth connection such that the data may be more easily transferred to and/or accessed by the other devices 106 from the particular device 106 and its associated storage block 110.

As another example, the particular device 106 and the associated storage block 110 may be configured such that the associated storage block 110 may be removed from the particular device 106. For example, the associated storage block 110 of the particular device 106 may be a removable SD card that may be transferred to another device 106. Due to its removable nature, the removable SD card may have a relatively high likelihood of loss and/or low likelihood of availability with respect to the storage network 102a. Therefore, the storage manager device 114 may allocate data to the storage block 110 that is a removable SD card accordingly. For example, the storage manager device 114 may only allocate data to the storage block 110 that is a removable SD card that is stored on another storage block 110 and/or that is not deemed to be critical if lost.

Location of the devices 106 may also play a role in the allocation of data. For example, the particular device 106 with a device type that is likely to always be in a central location (e.g., a desktop computer in a user's home) may have a high likelihood of being on and reachable such that it has more consistent connectivity with the other devices 106. As such, allocation of important data to the storage block 110 of the particular device 106 may be prioritized because of the high likelihood of the storage block 110 being accessible as well as the low likelihood of loss, which may be related to the location of the particular device 106 in some instances.

Health of the storage block 110 and/or the device 106 may play a role in the allocation of data in some instances. As the storage block 110 and/or the device 106 are used it may wear out such that a health of the storage block 110 and/or the device 106 may diminish over time. In some embodiments, the storage manager device 114 may be configured to monitor the health of the storage blocks 110 and/or the devices 106 (e.g., based on use, performance, and/or diagnostic information associated with the storage blocks 110 and the devices 106) and may allocate data accordingly. For example, the storage manager device 114 may not rely on the storage block 110 with diminished health or associated with the device 106 having diminished health for a desired redundancy of data and may therefore discount the contribution of the device 106 with diminished health with respect to the desired redundancy.

In some embodiments, the storage manager device 114 may be configured to monitor the actual use of the devices 106 and/or the storage blocks 110 and to adjust the allocation based on the actual use of the devices and/or the storage blocks 110, which may be different than initial assumptions that may have been made by the storage manager device 114. In some embodiments, the storage manager device 114 may look for patterns in the use of certain device types such that the storage manager device 114 may vary how it allocates data for similar device types based on the patterns of use. For example, the particular storage block 110 may be portable (e.g., the particular storage block 110 may be an SD card or may be included in a laptop computer) such that initial assumptions about the particular storage block 110 may assume sporadic availability and/or a high likelihood of loss. However, the actual use of the particular storage block 110 (and/or its associated device 106) may be such that the particular storage block 110 is constantly available and/or not transported often. Accordingly, the allocation of data to the particular storage block 110 may be modified based on the actual use of the particular storage block 110.

In some embodiments, the storage agents 104 may also report one or more device and storage block characteristics to the storage manager device 114 such that the storage manager device 114 may allocate data to the storage blocks 110 based on the reported characteristics. For example, the storage agent 104a may report available storage space of the storage block 110a to allow the storage manager device 114 to assess how to allocate data to the storage block 110a. Additionally, in some embodiments, the storage agent 104a may report information to the storage manager device 114 with respect to specific uses of the device 106a and/or the storage block 110a such that the storage manager device 114 may allocate data according to the specific uses. In these and other embodiments, the storage manager device 114 may track data that may be stored on the storage blocks 110 of the storage network 102a other than the storage block 110a that is frequently being accessed or called for by the device 106a. The storage manager device 114 may, accordingly, allocate that data, and/or data similar to it, to the storage block 110a such that the data may be stored locally on the storage block 110a for faster, more robust access instead of having to be accessed from another storage block 110 associated with another device 106. Therefore, the allocation may increase the likelihood that data accessed by the device 106a is stored locally on the storage block 110a instead of the storage block 110 remote from the device 106a.

In some embodiments, based on the device types and/or device characteristics, the storage manager device 114 may determine a redundancy value for the storage blocks 110, which may be based on the likelihood of being lost. For example, the storage block 110 associated with a smartphone may have a lower redundancy value than the storage block 110 associated with an external hard drive based on the likelihood of loss of a smartphone as compared to an external hard drive. In these or other embodiments, the storage manager device 114 may be configured to determine an availability value for the storage blocks 110 based on the storage block characteristics, device types, and/or device characteristics. The redundancy and/or availability values may be used to weight and/or rank the storage blocks 110 according to the roles they may play in a desired redundancy and/or availability scheme.

The reliability and/or availability of the particular device 106 or the storage block 110 may change over time as indicated by changes in their respective characteristics. The storage manager device 114 may be configured to monitor these changes and may adjust the characteristics of the particular device 106 or the storage block 110 accordingly. In some embodiments, the storage manager device 114 may be configured to adjust allocation of data according to changes in the characteristics.

The storage manager device 114 may also assign data to the storage blocks 110 based on one or more data characteristics of the data itself. The data characteristics may include, but are not limited to, data size, data type, a desired redundancy for the data, frequency of use of the data, a user preference with respect to the data, information included in the data, time of addition of the data to the storage network 102a and/or the storage agent 104, origination of the data, etc.

For example, a data type may be associated with whether or not the data file is a picture file, a video file, an audio file, or a document file. In some embodiments, the storage manager device 114 may be configured to allocate data of certain data types to the different storage blocks 110 based on the data types. For example, the storage manager device 114 may be configured to allocate audio files to the particular storage block 110 that may act as a repository for audio files.

Additionally, the storage manager device 114 may direct that data with a high frequency of use be allocated to many, and in some instances all, of the storage blocks 110 within the storage network 102a such that the data with high frequency of use may be easily accessed by the associated devices 106. Similarly, in some embodiments, the data may have a desired availability (e.g., based on a predicted frequency of use of the data) associated with it and the storage manager device 114 may allocate the data to the storage agents 104 based on roles of the storage agents 104 in achieving the desired availability. For example, the storage manager device 114 may direct that data with a high degree of desired availability be stored on multiple, if not all of, the storage blocks 110 to achieve the high degree of desired availability. As another example, the storage manager device 114 may direct that data with a high degree of desired availability may be stored on the storage block 110 associated with the device 106 that may have relatively consistent connectivity with the network 112 and/or the other devices 106 of the storage network 102a. Therefore, the likelihood of that data being available to the devices 106 may be increased.

As indicated above, in some embodiments, the storage manager device 114 may allocate data to the storage blocks 110 based on user preferences. For example, a user may "pin" particular data to the storage block 110a to indicate that the user desires that the particular data be stored on the storage block 110a. Based on the "pinning" of the particular data, the storage manager device 114 may accordingly allocate the particular data to the storage block 110a. Other examples of user preferences may include the user explicitly indicating that a certain data type (e.g., videos, photos, music, etc.), recently created data, and/or data originated from the certain device 106 be stored on the particular storage block 110.

In some embodiments, the storage manager device 114 may be configured to allocate data to the storage blocks 110 based on the data characteristics as the data characteristics relate to the device characteristics and/or storage block characteristics. For instance, the storage manager device 114 may look at data size and available storage space on the storage block 110a to determine whether to allocate data of a certain size to the storage block 110a. As another example, the device characteristics of the device 106a may indicate heavy use of music files by the user on the device 106a such that the storage manager device 114 may allocate data having a file type associated with music to the storage block 110a. In these or other embodiments, the storage manager device 114 may look at the desired redundancy of the data and the likelihood of loss and/or reliability of the devices 106 in determining to which and/or to how many storage blocks 110 to allocate the data. Similarly, in some embodiments, the storage manager device 114 may look at the desired availability of the data and the connectivity of the devices 106 in determining to which and/or to how many storage blocks 110 to allocate the data.

As another example, users often access data that is more recently created (newer data) more than data created at an earlier time (older data). Accordingly, the storage manager device 114 may allocate the newer data to the storage blocks 110 associated with the devices 106 of types that the user may be likely to access the data more often. In these or other embodiments, the storage manager device 114 may allocate newer data to the storage blocks 110 associated with the devices 106 that may have a high level of connectivity with the network 112 and/or the other devices 106 such that the newer data may be more easily accessed by the devices 106 even if it is not stored on the devices 106.

Conversely, the storage manager device 114 may allocate older data to the storage blocks 110 associated with the devices 106 that may store the data for backup purposes, but that may not allow for the data to be as readily accessible. For example, newer data may be allocated to the storage blocks 110 associated with the devices 106 that may be smartphones, tablets, personal computers, etc., and older data may be allocated to the storage blocks 110 associated with the devices 106 that may be external hard drives with limited connectivity, cloud storage servers, glacial storage devices, etc.

Further, the storage manager device 114 may be configured to consider the origination of the data during the allocation of the data to the storage blocks 110. For example, the storage manager device 114 may be configured to allocate data created by the device 106a to the storage block 110a because the user may be more likely to desire to access that data on the device 106a based on the data having originated on the device 106a.

In some embodiments, the storage manager device 114 may be configured to rank and allocate the data based on the data characteristics, device characteristics, and/or the storage block characteristics. For example, the storage manager device 114 may be configured to determine an availability rank for data with respect to a desired availability of the data on the devices. The availability rank may be based on one or more of the data characteristics for the data as they may relate to the device and storage block characteristics described above. By way of example, an availability rank of a certain data file with respect to the particular device 106 may be based on use of the particular device 106 with respect to the type of the certain data file, a user preference of the certain data file or type of the certain data file with respect to the particular device 106, frequency of use of the particular device 106 with respect to the certain data file, origination of the certain data file, when the data was created, etc.

Different storage agent characteristics, device characteristics, and data characteristics may be given different weights with respect to how they may relate to the ranking. For example, a user preference with respect to storage of a particular data file on the particular storage block 110 may be given a higher weight than location of the device.

After determining the availability ranking for the data files with respect to the devices 106, the storage manager device 114 may initially allocate the data files to the associated storage blocks 110 of the devices 106 based on the availability rankings for the data files and the available storage space on the storage blocks 110. Following the initial allocation based on the availability rankings, the storage manager device 114 may determine whether the initial allocation satisfies a desired redundancy for the data files. If the desired redundancy is not satisfied, the storage manager device 114 may adjust the allocation such that the desired redundancy is satisfied, which may be at the expense of the desired availability as indicated by the availability rankings.

For example, based on the availability rankings, a data file "A" may be ranked as top priority on the storage block 110a, followed by data files "B," "C," "D," and "E," in that order. For the storage block 110b, the data file "C" may be ranked highest, followed by the data files "E," "B," "A," and "D," in that order. Additionally, for the storage block 110c, the data file "A" may be ranked highest, followed by the data files "C," "E," "D," and "B," in that order.

The storage block 110a may have enough available storage space to store the data files "A," "B," "C," and "D" but not "E." Thus "E" may not be initially allocated to the storage block 110a because it has the lowest rank with respect to the storage block 110a. The storage block 110b may have enough available storage space to store the data files "C," "E," and "B," but not "A" and "D." Thus "A" and "D" may not be initially allocated to the storage block 110b because "A" and "D" are the lowest ranked data files with respect to the storage block 110b. The storage block 110c may have enough available storage space to store the data files "A," "C," and "E," but not "D" and "B." Thus, "D" and "B" may not be initially allocated to the storage block 110c because "D" and "B" are the lowest ranked data files with respect to the storage block 110c.

Following the initial allocation of the data files "A," "B," "C," "D," and "E," the storage manager device 114 may determine whether a desired redundancy for the data files "A," "B," "C," "D," and "E" has been met. In this example, the desired redundancy may be that the data files "A," "B," "C," "D," and "E" are stored on the at least two storage blocks 110. However, if the initial allocation of this example were to be followed, data file "D" would only be stored on the storage block 110a. Accordingly, the storage manager device 114 may determine whether a reallocation may be performed to achieve the desired redundancy for the data file "D."

For example, the data file "C" is initially allocated to the storage blocks 110a, 110b, and 110c in the present example. Therefore, the allocation of the data file "C" to the storage block 110b or the storage block 110c may be replaced by an allocation of the data file "D" to satisfy the desired redundancy of the data file "D." Selection of the storage block 110b or the storage block 110c for storage of the data file "D" may be based on the relative ranking of the data file "D" with respect to the storage blocks 110b and 110c, the available storage space on the storage blocks 110b and 110c, or any other applicable storage block characteristics of the storage blocks 110b and 110c and/or device characteristics of the devices 106b and 106c as they may relate to the desired redundancy of the data file "D."

In some embodiments, the storage manager device 114 may also be configured to designate the particular storage block 110 as a primary repository of data or secondary repository of the data based on one or more of the storage block characteristics of the particular storage block 110, device characteristics of the device 106 associated with the particular storage block 110 and/or based on one or more of the data characteristics. The storage block 110 acting as a primary repository of particular data may be configured to store "primary" copies of the particular data, which may indicate that the storage block 110 acting as a primary repository of the particular data may be relied upon as providing redundancy for the particular data. By contrast, the storage block 110 acting as a secondary repository of particular data may be configured to store "secondary" copies of the particular data, which may indicate that the storage block 110 acting as a secondary repository of the particular data may not be relied upon as providing redundancy for the particular data. The storage block 110 may be configured to store primary copies of some data while also being configured to store secondary copies of other data. Whether or not the storage block 110 acts as a primary or secondary repository for data may depend on the health of the storage block 110 or its associated device 106 in some instances.

The storage agents 104 may also be configured to remove data from the storage blocks 110 and/or the storage manager device 114 may be configured to instruct the storage agents 104 to remove the data based on the storage block characteristics, device characteristics, and/or data characteristics. For example, when the available storage space of the storage block 110 is at or near capacity, the storage block 110 may delete data with a low ranking (e.g., availability ranking) to make space for other data that may have a higher ranking. As another example, in some embodiments, the storage agents 104 may not be able to remove particular data from the certain storage block 110 when the certain storage block 110 is designated as a primary repository for the particular data without express permission from the storage manager device 114 or from the user after the user has been notified of the possible permanent loss of the particular data. In contrast, in some embodiments, the storage agents 104 may delete data stored on the particular storage block 110 as secondary copies whenever deemed necessary by the storage agents 104 without permission or instruction from the storage manager device 114. Additionally, in some embodiments, the user may "unpin" data from the particular device 106 and/or the storage block 110 such that a priority of maintaining the data on the particular device 106 and/or the storage block 110 may be reduced. A reduced priority of maintaining the data on the particular device 106 and/or the storage block 110 may allow the unpinned data to be removed from the particular device 106 and/or the storage block 110.

In some embodiments, the storage manager device 114 may be configured to determine an overall health of the storage network 102a based on the allocation of data throughout the storage network 102a and the individual devices 106. For example, if data is being stored as primary copies on the devices 106 and the storage blocks 110 that have a relatively high likelihood of loss and/or a relatively low health rating, the health of the storage network 102a may be considered low as compared to data being stored as primary copies on the devices 106 and the associated storage blocks 110 that have a relatively low likelihood of loss and/or a relatively high health rating. As another example, the health of the storage network 102a when the storage network 102a does not satisfy a desired redundancy and/or availability for data may be considered low as compared to when the storage network 102a does satisfy a desired redundancy and/or availability for the data.

The storage manager device 114 may be configured to monitor the device types, device characteristics, device health, data characteristics, etc. on a continuous basis and perform allocation in a manner described above based on changes that may be indicated by the monitoring. Accordingly, the storage manager device 114 may be configured to perform dynamic allocation, where the allocation for the storage agents 104 may change. Additionally, changes associated with one storage agent 104 may affect the allocation of data associated with another storage agent 104.

For example, in some embodiments, the particular device 106 with the storage agent 104 acting as a primary repository for a particular data file may fail such that a desired redundancy for the particular data file may not be satisfied. The storage manager device 114 may accordingly allocate the particular data file to another storage agent 104 and may designate the other storage agent 104 as a primary repository for the particular data file based on the failure of the particular device 106 and based on the desired redundancy of the particular data file.

As another example, the particular storage agent 104 may be associated with the device 106 that may have had much more limited connectivity with the storage network 102a than previously. The storage manager device 114 may not rely on the particular storage agent 104 as much for redundancy and/or availability and may allocate data stored on the particular storage agent 104 accordingly.

Figure 1B:
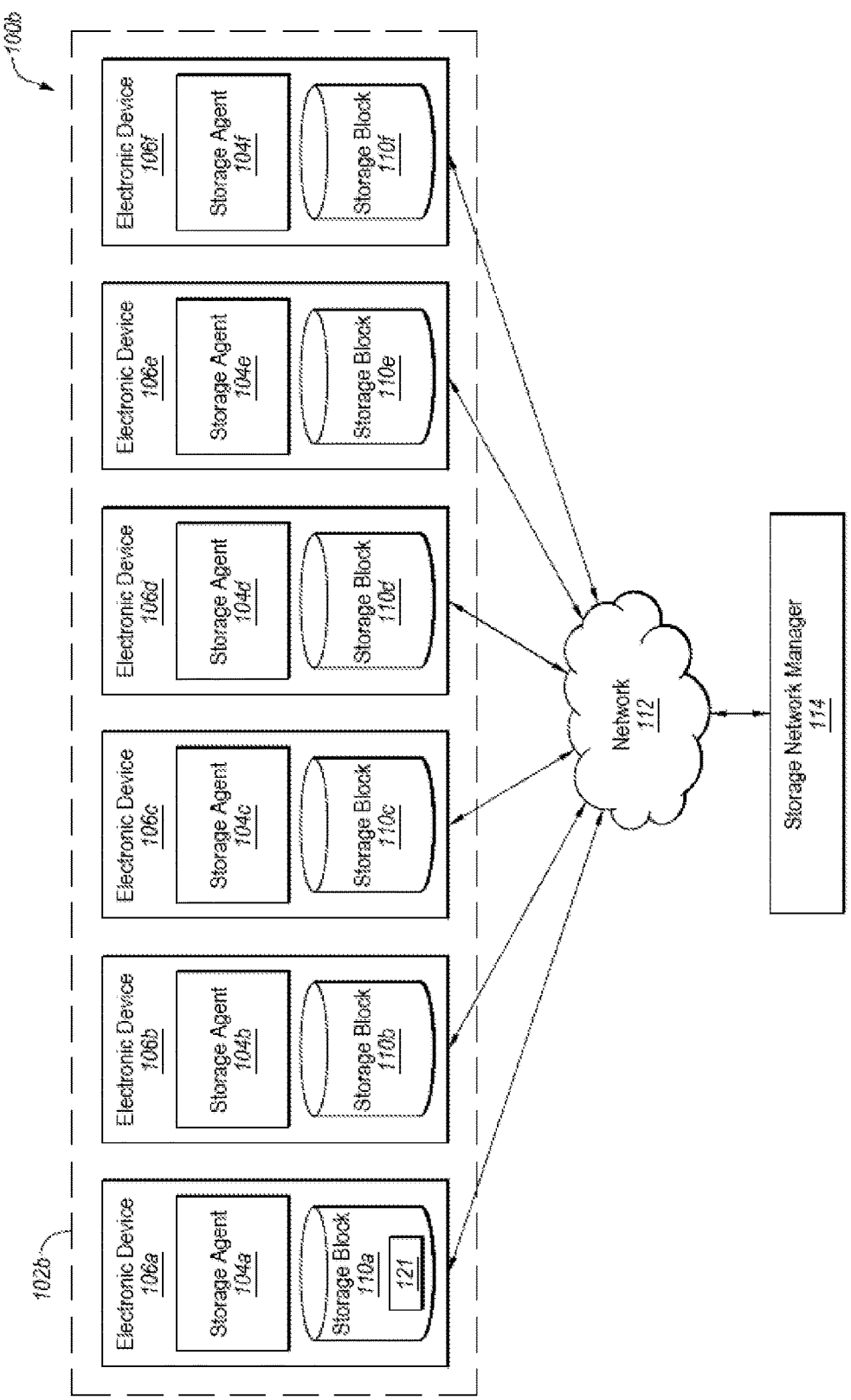
FIG. 1B illustrates an example storage system configured to determine a distribution strategy for distributing data to storage blocks included in a storage network.

As mentioned above, the storage manager device 114 may also be configured to determine a distribution strategy for distributing particular data to the storage blocks 110 to which the particular data has been allocated. FIG. 1B illustrates an example storage system 100b configured to determine a distribution strategy for distributing data to the storage blocks 110, according to at least one embodiment of the present disclosure.

The storage system 100b may be an expanded example of the storage system 100a of FIG. 1A. For example, the storage system 100b may include the network 112, the storage manager device 114, and the devices 106a-106c with their associated storage agents 104a-104c and the storage blocks 110a-110c. However, the storage system 100b may differ from the storage system 100a in that a storage network 102b of the storage system 100b may be depicted with more devices 106 and the associated storage agents 104 and the storage blocks 110 than the storage network 102a of the storage system 100a. For example, the storage network 102b is depicted as including devices 106d, 106e, and 106f with associated storage agents 104d, 104e, and 104f, respectively, and storage blocks 110d, 110e, and 110f, respectively, which are not depicted in the storage network 102a of FIG. 1A.

Although, the devices 106a-106f are not depicted in FIG. 1B with all of the elements (e.g., controller, processor, memory, and communication module) as the devices 106a-106c of FIG. 1A, those elements may be included in the devices 106a-106f and are merely not depicted in FIG. 1B. Additionally, the expansion of the storage network 102b with respect to the storage network 102a is to facilitate describing the determination of the distribution strategy and is not limited to storage networks having only the same number of the devices 106 and the storage agents 104 as the storage network 102b.

The storage manager device 114 may be configured to determine distribution strategies for distributing the allocated data to the storage blocks 110 based on the characteristics of the storage blocks 110, the devices 106, and/or the data characteristics of the data allocated to the storage blocks 110. In these or other embodiments, the storage manager device 114 may be configured to determine a distribution strategy for particular data based on the data characteristics and/or allocation of other data as well as the different storage blocks 110 to which the particular data may be allocated.

For example, in some embodiments, the storage block 110a may have data 121 stored thereon that has been allocated for storage on the storage block 110f such that the storage block 110a may be a host storage block and the storage block 110f may be a target storage block with respect to the data 121. The storage manager device 114 may be configured to determine a distribution strategy for distributing the data 121 from the storage block 110a to the storage block 110f based on one or more characteristics associated with the devices 106a-106f and/or the storage blocks 110a-110f. In these or other embodiments, the one or more other storage blocks 110 may be host storage blocks or target storage blocks of the data 121. Once the distribution strategy has been determined, one or more of the storage agents 104 may be configured to execute the distribution strategy.

In some embodiments, a characteristic that may be used by the storage manager device 114 for determining the distribution strategy may be connectivity of the devices 106a-106f with respect to the storage network 102b (e.g., the connectivity of the devices 106a-106f with respect to each other). For example, the devices 106a and 106f may not be able to communicate with each other, but the device 106b may be able to communicate with both the devices 106a and 106f. A situation like this may occur, by way of example, when the devices 106a and 106b are both connected (e.g., through a wireless or wired connection) to the network 112 and the device 106f is not connected to the network 112 but is connected to the device 106b. In instances such as these, the storage manager device 114 may be configured to determine a distribution strategy from the storage block 110a to the storage block 110f where the storage agent 104a may relay the data 121 or a copy of the data 121 to the storage agent 104b, which may then relay the data 121 to the storage agent 104f, which may direct that the data 121 be stored in the storage block 110f.

Another characteristic that may be used by the storage manager device 114 for determining the distribution strategy may be the types of connections of the devices 106a-106f with each other. For example, the devices 106a and 106f may be connected to each other via the network 112. Additionally, the device 106a may be connected to the network 112 through a non-cellular wireless Internet connection (e.g., Wi-Fi) while the device 106*f* may be connected to the network 112 via a cellular network connection. Therefore, distributing the data 121 from the storage block 110*a* of the device 106*a* to the storage block 110*f* of the device 106*f* via the network 112 may use data in an associated cellular data plan, which may have a higher cost than if a non-cellular connection were used. However, the device 106*b* may be directly connected to the device 106*f* and may also be connected to the network 112 via a non-cellular wireless Internet connection. Accordingly, in some embodiments, the storage manager device 114 may determine a distribution strategy where the data 121 is relayed by the storage agent 104*a* from the storage block 110*a* to the storage agent 104*b* and then from the storage agent 104*b* to the storage agent 104*f* for storage on the storage block 110*f*. Therefore, the cost of the transfer may be less than if a transfer from the device 106*a* to the device 106*f* via the network 112 were used. As another example, the storage manager device 114 may determine a similar distribution strategy in instances where the devices 106*a* and 106*f* may be connected to each other and the device 106*b* (e.g., directly or via the network 112), but the bandwidths of their respective connections with the device 106*b* may be higher than the bandwidth of the connection between the devices 106*a* and 106*f*.

Another device characteristic used by the storage manager device 114 for determining the distribution strategy may be the frequency of connections of the devices 106*a*-106*f*. For example, the device 106*e* may be connected to the device 106*f* more often than the device 106*e* is connected to the device 106*a*. In these and other embodiments, when the device 106*f* is not connected to any other device 106 of the storage network 102*b* that is also connected to the device 106*a*, but the devices 106*a* and 106*e* are connected to each other, the storage manager device 114 may determine a distribution strategy where the storage agent 104*a* may distribute the data 121 to the storage agent 104*e*. The distribution strategy may then direct the storage agent 104*e* to distribute the data 121 to the storage agent 104*f* when the devices 106*e* and 106*f* are connected, which may be likely to occur sooner than the device 106*a* being connected to the device 106*f*.

In some embodiments, the frequency and/or quality of connections between the devices 106 may be related to how often the devices 106 are in the same vicinity with each other. Accordingly, in some embodiments, the storage manager device 114 may also consider the locations of the devices 106 with respect to each other as a device characteristic when determining the distribution strategy.

In some embodiments, the distribution strategy may be based on a characteristic such as general connectivity of the devices 106 as well as redundancy or availability provided by the devices 106 and their corresponding storage blocks 110. For example, the storage block 110*a* may have other data than just the data 121 stored thereon and the other data may be allocated for storage on the other storage blocks 110. Additionally, the amount of data that may be distributed from the storage block 110*a* by the storage agent 104*a* to the other storage agents 104 and the storage blocks 110 may be limited at any one time due to the connectivity (e.g., due to its bandwidth) of the device 106*a* with the storage network 102*b*. Accordingly, in some embodiments, the storage manager device 114 may determine a distribution strategy of the data 121 and the other data stored on the storage block 110*a* according to an assigned rank of the storage block 110*f* with respect to the data 121 as compared to an assigned rank of another target storage block with respect to the other data stored on the storage block 110*a*.

By way of example, the other data stored on the storage block 110*a* may be allocated for the storage block 110*b* and the data 121 stored on the storage block 110*a* may be allocated for the storage block 110*f*. Additionally, due to connectivity limitations, the storage agent 104*a* may not be able to transfer the other data to the storage agent 104*b* and the storage block 110*b* while also transferring the data 121 to the storage agent 104*f* and the storage block 110*f* at the same time. Further, the other data may have a higher rank for storage on the storage block 110*b* than the data 121 may have for storage on the storage block 110*f*. Accordingly, the distribution strategy may call for distribution of the other data to the storage block 110*b* before distribution of the data 121 to the storage block 110*f*.

The storage manager device 114 may also determine the distribution strategy based on the allocation of data on other devices as well as the above-listed device and storage block characteristics. For example, the storage block 110*a* may have a relatively large amount of data, including the data 121, stored thereon that has been allocated for a large number of target storage blocks. Additionally, the storage block 110*d* may have a relatively small amount of data, including the data 121 (not expressly depicted as being stored on the storage block 110*d*), stored thereon that has been allocated for a relatively small number of target storage blocks. Accordingly, the storage manager device 114 may determine a distribution strategy where the data 121 may be distributed from the storage block 110*d* to the storage block 110*f* instead of from the storage block 110*a* such that the storage agent 104*a* may distribute the other data stored on the storage block 110*a* without having to also distribute the data 121.

Similarly, in some embodiments, the data 121 may be allocated to the storage block 110*e* and the storage block 110*f* as target storage blocks, but may initially only be stored on the storage block 110*a*. Additionally, the storage block 110*a* may have a relatively large amount of data stored thereon that has been allocated for a relatively large number of target storage blocks. Accordingly, the storage manager device 114 may determine a distribution strategy where the data 121 may be distributed from the storage block 110*a* to the storage agent 104*e* (which may store the data 121 on the storage block 110*e*) and then from the storage agent 104*e* to the storage agent 104*f* (which may store the data 121 on the storage block 110*f*) or from the storage block 110*a* to the storage agent 104*f* (which may store the data 121 on the storage block 110*f*) and then from the storage agent 104*f* to the storage agent 104*e* (which may store the data 121 on the storage block 110*e*). Therefore, the storage agent 104*a* may distribute other data to other storage blocks after distributing the data 121 once instead of having to distribute the data 121 multiple times before moving on to distributing the other data.

Moreover, the storage manager device 114 may be configured to determine the distribution strategy based on a power status of the devices 106. The power status may indicate whether the particular device 106 is plugged in or running on battery power. Additionally, the power status may indicate how much charge may be remaining in the battery. In some embodiments, the storage manager device 114 may determine a distribution strategy where the devices 106 that are plugged in are prioritized as transferring data over those that are running on battery power to help conserve the battery power. Further, in these or other embodiments, the devices 106 with more battery life than the other devices 106 may also be prioritized for transferring data over the other devices with less battery life.

The storage manager device 114 may also determine the distribution strategy based on the data characteristics of the data that is to be distributed. For example, the storage manager device 114 may determine that a certain data type may have a higher distribution priority than another data type. Accordingly, the storage manager device 114 may develop a distribution strategy such that data that is of a higher priority data type is distributed to target storage blocks before data of a lower priority data type.

As another example, the storage manager device 114 may develop a distribution strategy where data with a higher desired redundancy and/or accessibility may be distributed to its target storage blocks before data with a lower desired redundancy and/or accessibility. For example, the storage manager device 114 may prioritize the distribution of data files that are to be stored as primary copies on target storage blocks over the distribution of data files that may be stored as secondary copies on their target storage blocks.

Further, in some embodiments, the storage manager device 114 may determine the distribution strategy based on the device characteristics and how they may relate to the data characteristics. For example, in some embodiments, the data 121 may be allocated for storage as a primary copy on the storage agents 104e and 104f. Additionally, the device 106e may be a smartphone and the device 106f may be a desktop computer. Accordingly, the storage manager device 114 may determine a distribution strategy where the data 121 is prioritized for distribution to the storage block 110f over distribution to the storage block 110e because the device 106f may be more reliable than the device 106e.

As another example, the data 121 may be a music file allocated for the storage blocks 110e and 110f. The storage manager device 114 may observe that the device 106e may have accessed music much more often than the device 106f. Accordingly, in some embodiments, the storage manager device 114 may determine the distribution strategy based on the data type (e.g., music file) and device use (e.g., access music often) such that distribution of the data 121 to the storage block 110e is prioritized over distribution to the storage block 110f because of the high use of the device 106e for listening to music as compared to the device 106f.

Additionally, in some embodiments, the storage manager device 114 may determine the distribution strategy based on user preferences. For example, in some embodiments, the user may indicate a desire that the data 121 be stored on the storage block 110f. The storage manager device 114 may therefore develop a distribution strategy that prioritizes distributing the data 121 to the storage block 110f over the other storage agents 104 that may also be target storage agents for the data 121.

Further, in some embodiments, the storage manager device 114 may determine the distribution strategy for the data 121 based on the size of the data 121. For example, when the data 121 is relatively large and would use a relatively large amount of bandwidth, the storage manager device 114 may determine a distribution strategy for the data 121 that schedules the distribution of the data 121 at a time where there may be relatively low use of communication resources, such as late at night.

In these or other embodiments, the storage manager device 114 may determine the distribution strategy based on the time when the data 121 is added to the storage network 102b. For example, when the data 121 is relatively new data, the data 121 may be more likely to be accessed than when the data 121 is relatively older data. Accordingly, the distribution strategy may prioritize distribution of the data 121 over older data but not over newer data.

Modifications, additions, or omissions may be made to the storage systems 100a and 100b without departing from the scope of the present disclosure. For example, the storage systems 100a and 100b may include any number of the devices 106, the storage blocks 110, and/or the storage agents 104. Further, the locations of components within the devices 106 are for illustrative purposes only and are not limiting. Additionally, although the allocation and distribution of data is described as being performed by the storage manager device 114 with respect to the storage networks 102a and 102b, the principles and teachings associated with the allocation and/or distribution of data may be applied in and by any suitable element of any applicable storage network and/or storage system.

Figure 2:
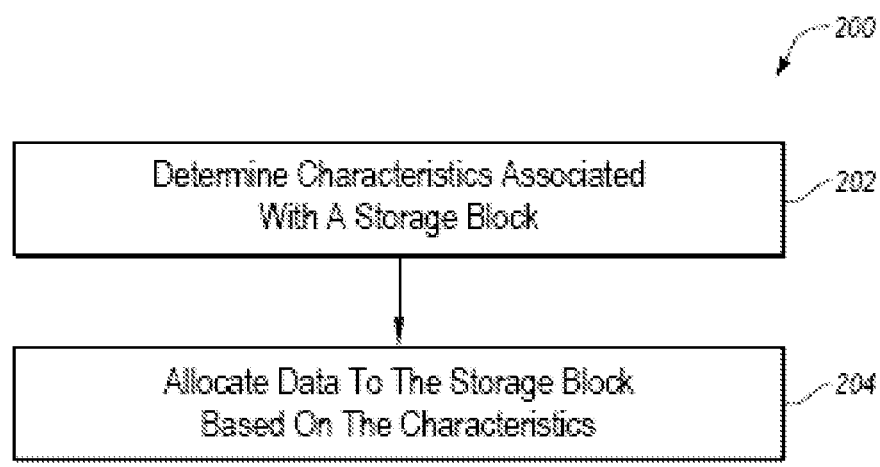
FIG. 2 is a flowchart of an example process of allocating data to a storage block of a storage network.

FIG. 2 is a flowchart of an example method 200 of allocating data to a storage block of a storage network, according to at least one embodiment described herein. One or more steps of the method 200 may be implemented, in some embodiments, by one or more components of the storage systems 100a and/or 100b of FIGS. 1A and 1B, such as the storage manager device 114, the storage agents 104, or the devices 106. Although illustrated as discrete blocks, various blocks may be divided into additional blocks, combined into fewer blocks, or eliminated, depending on the desired implementation.

The method 200 may begin at block 202, where a plurality of characteristics associated with a storage block included in a storage network may be determined. The plurality of characteristics may include storage capacity of the storage block, available storage space of the storage block, likelihood of loss of data stored on the storage block, availability of the storage block with respect to the storage network, and use of the storage block.

At block 204, data may be allocated to the storage block based on the plurality of characteristics. In some embodiments, the allocation may be further based on a type of the storage block, a health of the storage block, a device type of a device associated with the storage block, use of the device, a likelihood of loss of the device, a health of the device, a location of the device, connectivity of the device with the storage network, a cost of connectivity of the device with the storage network, and a reliability of the device.

Accordingly, the method 200 may be performed to allocate data to one or more storage blocks of a storage network based on characteristics associated with the storage blocks. Allocation of data in this manner may provide for an improved user experience and redundancy within the storage network over existing data storage schemes.

One skilled in the art will appreciate that, for the method 200 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 200 may include further steps associated with determining a desired redundancy of the data and determining a redundancy role of the storage block for the data based on the plurality of characteristics. In these and other embodiments, the method 200 may further include allocating the data to the storage block based on the redundancy role of the storage agent.

Further, the method 200 may include steps associated with assigning the storage agent as a primary repository or a secondary repository of the data based on the plurality of characteristics. The method 200 may also include steps associated with allocating the data for storage on the storage block based on a data characteristic of the data. The data characteristic may include any one or more of data type, frequency of use of the data, desired redundancy for the data, size of the data, a ranking of the data, information included in the data, a user preference with respect to the data, time of addition of the data to the storage network and/or a storage agent, origination of the data, etc. In some embodiments, the allocation may be based on how the data characteristic relates to one or more of the plurality of characteristics.

Figure 3:
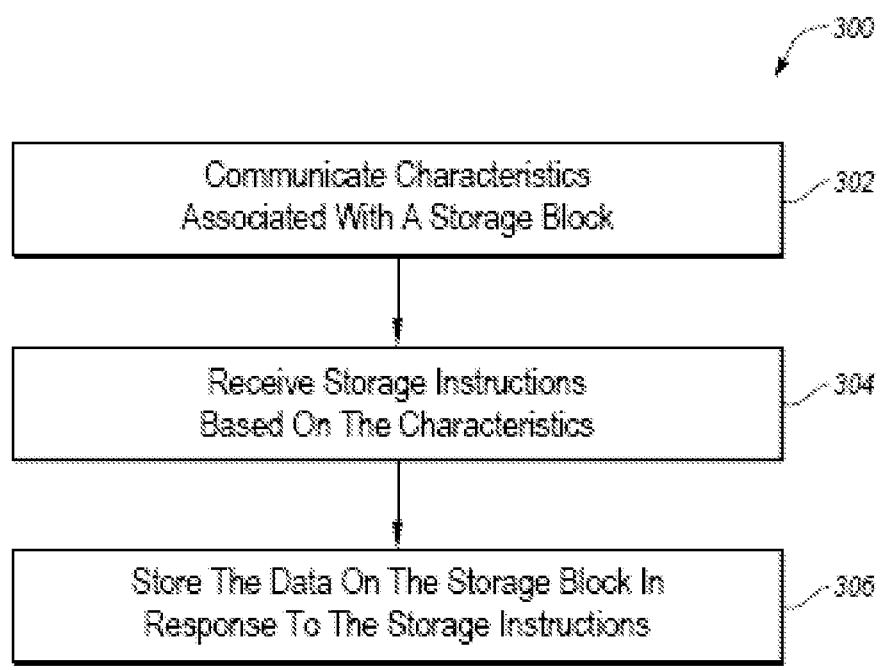
FIG. 3 is a flowchart of an example process of storing data on a storage block of a storage network.

FIG. 3 is a flowchart of an example method 300 of storing data on a storage block of a storage network, according to at least one embodiment described herein. One or more steps of the method 300 may be implemented, in some embodiments, by one or more components of the storage systems 100a and/or 100b of FIGS. 1A and 1B, such as the storage manager device 114, the storage agents 104, or the devices 106. Although illustrated as discrete blocks, various blocks may be divided into additional blocks, combined into fewer blocks, or eliminated, depending on the desired implementation.

The method 300 may begin at block 302, where a plurality of characteristics associated with a storage block included in a storage network may be communicated to a storage network manager such as the storage manager device 114 of FIGS. 1A and 1B. The plurality of characteristics may include storage capacity of the storage block, available storage space of the storage block, likelihood of loss of data stored on the storage block, availability of the storage block with respect to the storage network, and use of the storage block.

At block 304, a storage instruction for storing data on the storage block may be received from the storage network controller. The storage command may be based on the plurality of characteristics. At block 306, the data may be stored on the storage block in response to the storage instruction.

Accordingly, the method 300 may be performed to store data on a storage block of a storage network based on characteristics associated with the storage blocks and their associated devices. Allocation of data in this manner may provide for an improved user experience and redundancy within the storage network over existing data storage schemes.

One skilled in the art will appreciate that, for the method 300 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 300 may include steps associated with storing the data on the storage block based on a data characteristic of the data. The data characteristic may include any one or more of data type, frequency of use of the data, desired redundancy for the data, size of the data, a ranking of the data, information included in the data, a user preference with respect to the time of addition of the data to the storage network and/or a storage agent, origination of the data, etc.

Figure 4:
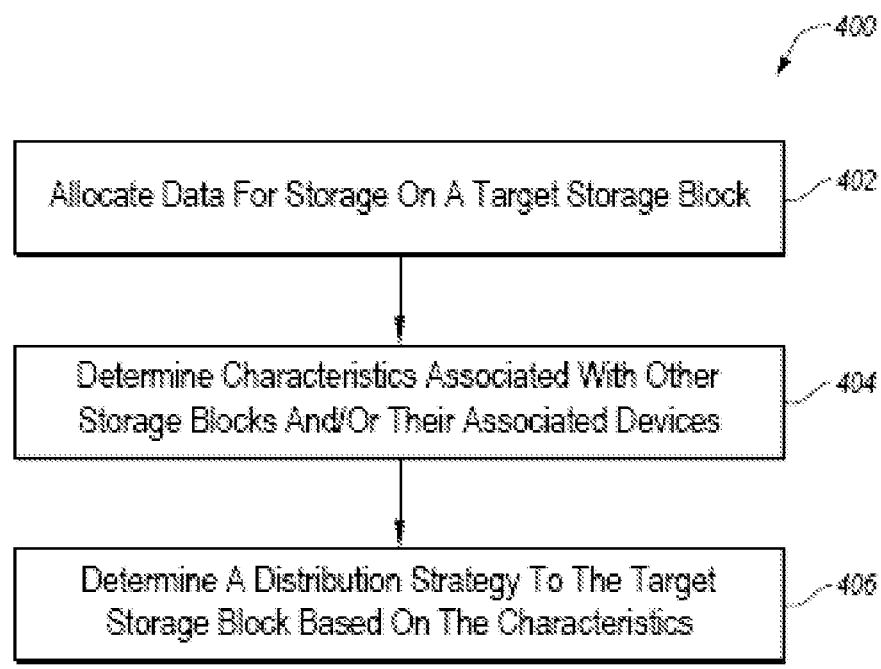
FIG. 4 is a flowchart of an example process of determining a distribution strategy for distributing data to storage blocks of a storage network.

FIG. 4 is a flowchart of an example method 400 of determining a distribution strategy for distributing data to storage blocks of a storage network, according to at least one embodiment described herein. One or more steps of the method 400 may be implemented, in some embodiments, by one or more components of the storage systems 100a and/or 100b of FIGS. 1A and 1B, such as the storage manager device 114, the storage agents 104, and/or the one or more devices 106. Although illustrated as discrete blocks, various blocks may be divided into additional blocks, combined into fewer blocks, or eliminated, depending on the desired implementation.

The method 400 may begin at block 402, where data stored on a host storage block may be allocated for storage on a target storage block. The host storage block and the target storage block may be included in a storage network that also includes one or more other storage blocks, such as the storage networks 102a and 102b of FIGS. 1A and 1B. In some embodiments, the allocation may be performed according to the allocation described above. For example, in some embodiments, the allocation may be performed based on a plurality of characteristics associated with the target storage block where the plurality of characteristics may include storage capacity of the storage block, available storage space of the storage block, likelihood of loss of data stored on the storage block, availability of the storage block with respect to the storage network, and use of the storage block. In these or other embodiments, the allocation may be made based on a data characteristic of the data.

At block 404, characteristics of the other storage agents and/or one or more devices associated with the other storage agents may be determined. The characteristics may include connectivity of the one or more devices with the storage network, a power status of the one or more devices, use of the devices, and locations of the one or more devices. As mentioned above, the connectivity of the devices may include cost of the connectivity, frequency of the connectivity, bandwidth of the connectivity, and type of connection.

At block 406, a distribution strategy for distributing the data from the host storage block to the target storage block may be determined based on the characteristics determined at block 404. In some embodiments, the distribution strategy may be based on a rank of the target storage block with respect to the data. In these or other embodiments, the distribution strategy may be determined based on the allocation of the data to other storage blocks and/or the allocation of other data stored on the host storage block.

Additionally, in some embodiments, the distribution strategy may be determined based on one or more data characteristics of the data such as data type, a desired redundancy of the data, a desired availability of the data, size of the data, time of addition of the data to the storage network, and a user preference associated with the data. In these or other embodiments, the distribution strategy may be determined based on how the data characteristics may relate to the characteristics associated with the other storage blocks, the target storage block, and/or the host storage block.

Accordingly, the method 400 may be performed to determine a distribution strategy for data. Distribution of data in this manner may provide for an improved user experience and redundancy within a storage network over existing data storage schemes.

One skilled in the art will appreciate that, for the method 400 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

As described above, the embodiments described herein may include the use of a special-purpose or general-purpose computer (e.g., the processors 150 of FIG. 1A) including various computer hardware or software modules, as discussed in greater detail below. The special-purpose or general-purpose computer may be configured to execute computer-executable instructions stored on computer-readable media (e.g., the memories 152 and/or the storage blocks 110 of FIG. 1A).

In some embodiments, the storage manager device 114 as shown in FIGS. 1A 1B may act as a storage hub or a user device (e.g., image storage hub 500). A storage hub, for example, may be used to store, collate, collect, organize, and/or distribute data stored in the various storage blocks 110 of the various electronic devices 106. The storage hub may be an electronic device 106 as shown in FIG. 1A or 1B or any other device that manages the storage of data among a number of devices.

Figure 5:
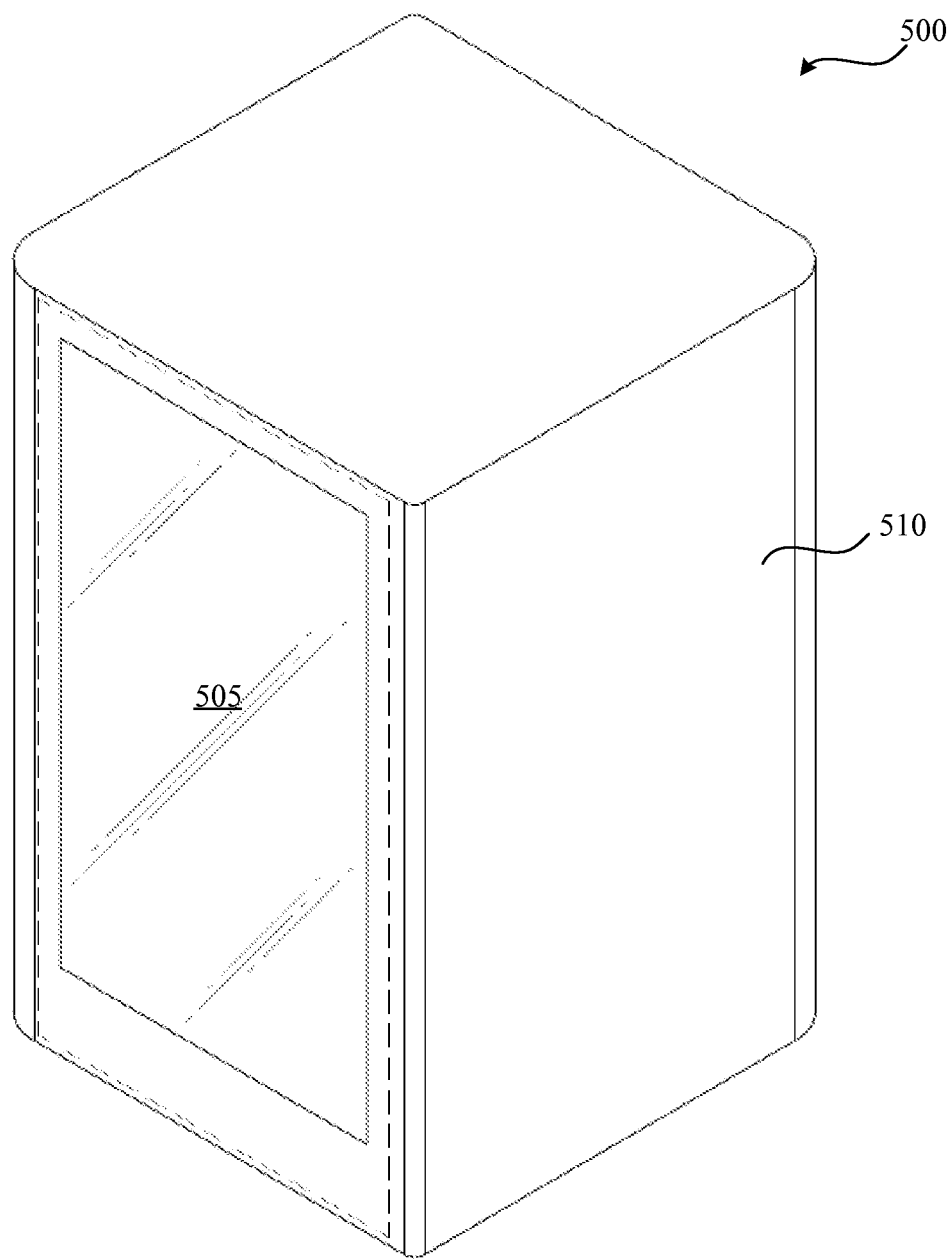
FIG. 5 illustrates an example storage manager device with a display according to some embodiments described herein.
Figure 9:
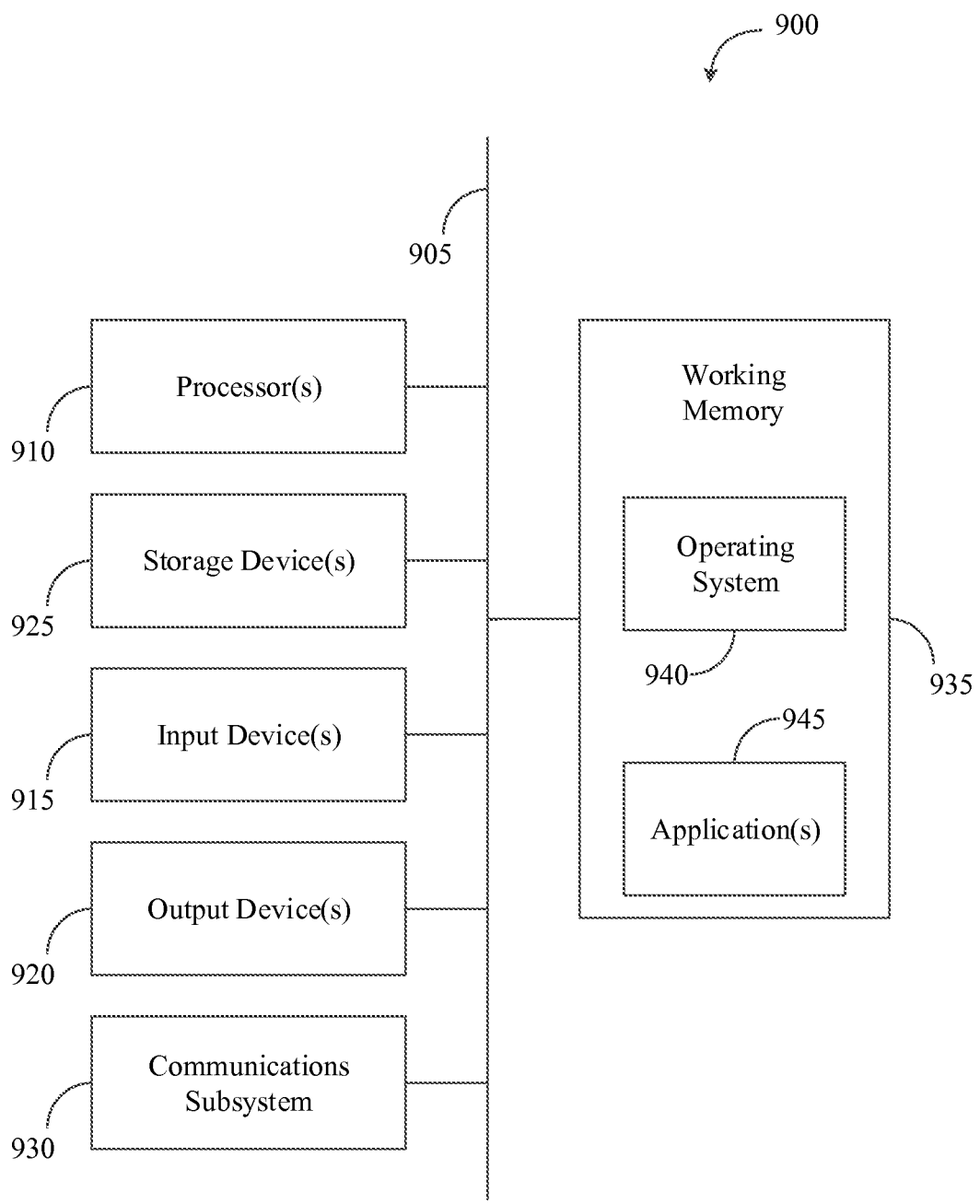
FIG. 9 shows an illustrative computational system for performing functionality to facilitate implementation of embodiments described herein.

FIG. 5 illustrates an example image storage hub 500 with a display 505 according to some embodiments described herein. In some embodiments, the image storage hub 500 may be a storage manager device 114, a device 106 shown either or both of FIGS. 1 and 2, and/or a computing device 900 shown in FIG. 9. The image storage hub 500 may include the display 505 and a housing 510. The display 505 may be configured to display images provided by a processor (e.g., the processor 150 and/or the processor 910) and/or stored in local storage of the image storage hub 500 (e.g., the storage block 110 and/or the storage device(s) 925).

Images may be received at the image storage hub 500, for example, from a remote storage location through a communication interface (e.g., the communication module 166 and/or the communication subsystem 930). The communication interface may be a wired interface, such as, for example, a USB interface, a network interface, etc. or a wireless interface, such as, for example, a Bluetooth interface, a Wi-Fi interface, a cellular interface, etc.

In some embodiments, images stored in local storage of the image storage hub 500 may be periodically displayed on display 505 with first transitions between images. Images being received at the image storage hub 500 through the communication interface may also be periodically displayed on display 505 with second transitions between images. The second transitions between images may be different than the first transitions between images. In some embodiments, the first transitions may include one or more actions that are opposite the actions of the second transitions.

Figure 6A:
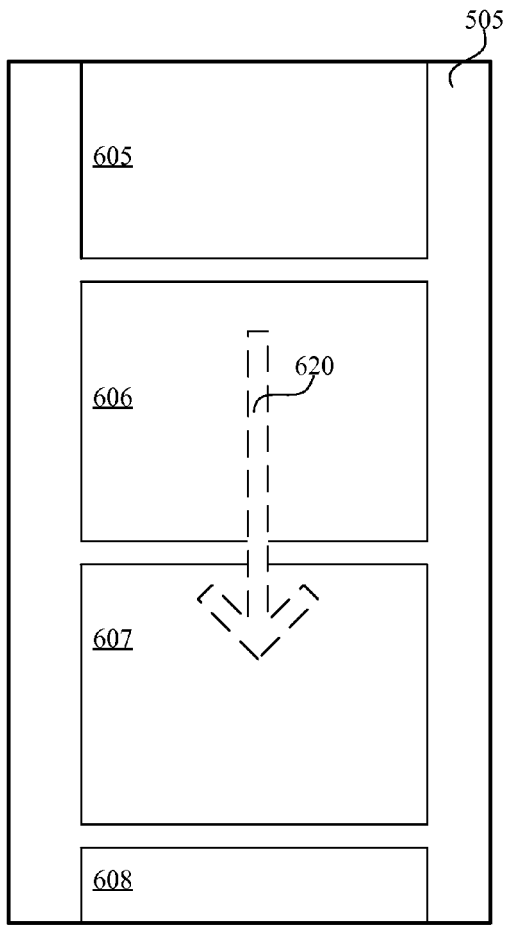
FIGS. 6A and 6B illustrate examples of image scrolling on a display according to some embodiments described herein.
Figure 6B:
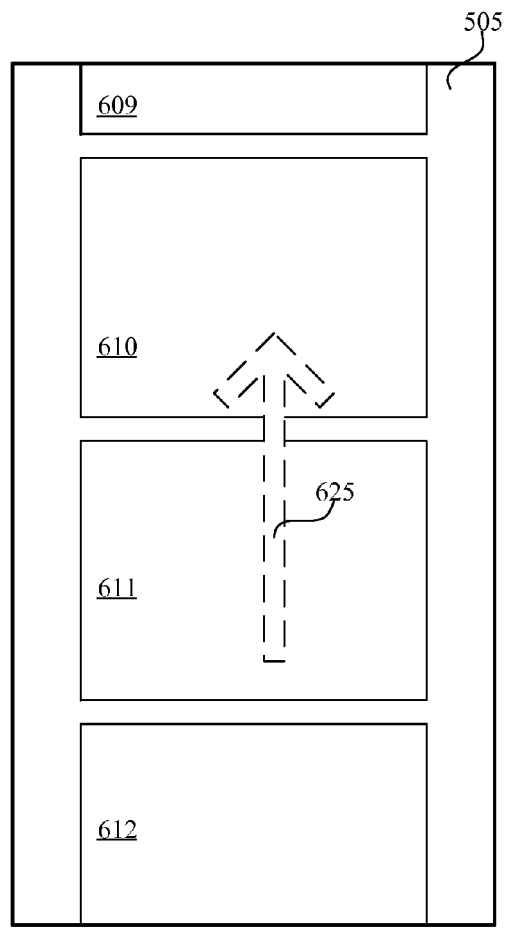

Scrolling of images across the display 505 is one example of first transitions and/or second transitions. FIGS. 6A and 6B illustrate examples of image scrolling on the display 505 according to some embodiments described herein. In FIG. 6A the images 605, 606, 607, and 608 scroll from the top of the display 505 toward the bottom of the display 505 as indicated by vertical arrow 620. In FIG. 6B the images 609, 610, 611, and 612 scroll from the bottom of the display 505 toward the top of the display 505 as indicated by vertical arrow 625. FIG. 6A may represent a second transition and FIG. 6B may represent a first transition. These transitions, for example, are opposite in their direction of scrolling. In some embodiments, FIG. 6A may be used to display images being added to the local storage through the communication interface, and FIG. 6B may be used to display images that are already part of the local storage.

In some embodiments, the images displayed in FIG. 6B may pause at a specific location within display 605 prior to transitioning to the next image, and the images displayed in FIG. 6A may not pause at any location within display 610 prior to transitioning to the next image. In some embodiments, the images displayed in FIG. 6B may scroll slower than the images displayed in FIG. 6A. For example, images storage locally may scroll more slowly than the images being received from a remote storage location.

Figure 7A:
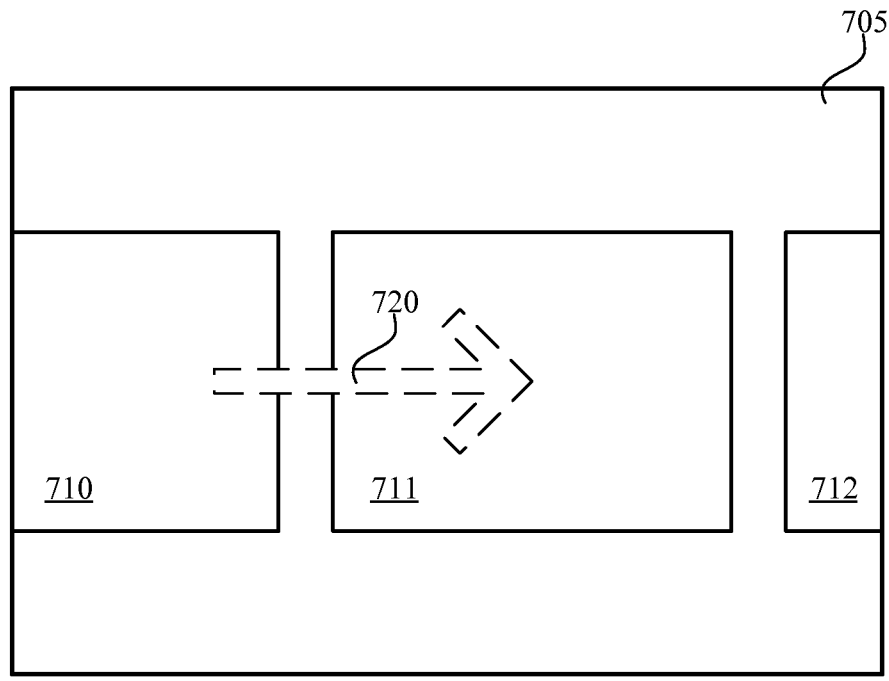
FIGS. 7A and 7B illustrate examples of image scrolling on a display according to some embodiments described herein.
Figure 7B:
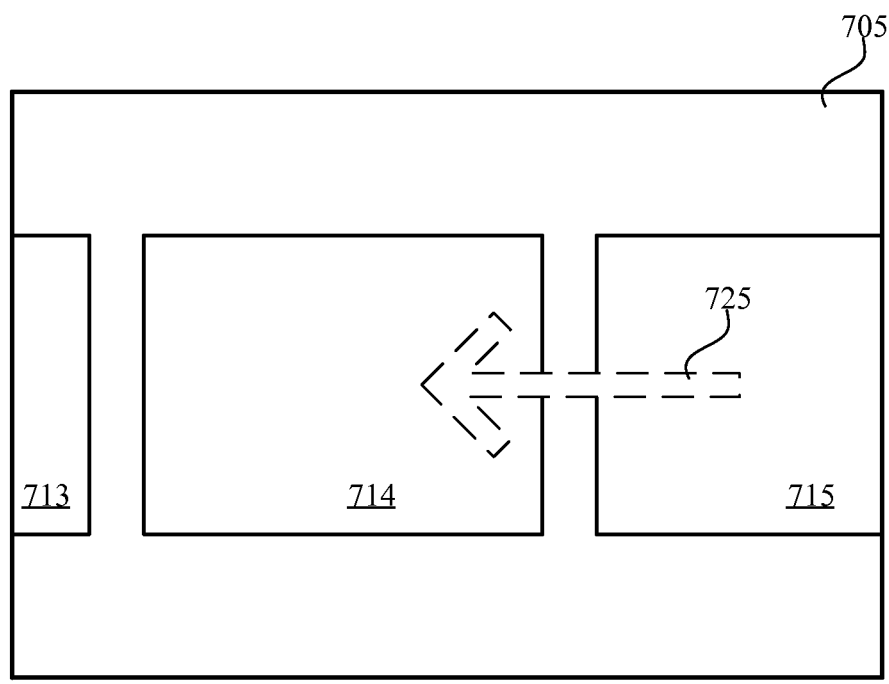

FIGS. 7A and 7B illustrate examples of image scrolling on a display 705 according to some embodiments described herein. In FIG. 7A the images 710, 711 and 712 scroll from the left of the display 705 toward the right of the display 705 as indicated by horizontal arrow 720. In FIG. 7B the images 713, 714 and 715 scroll from the right of the display 705 toward the left of the display 705 as indicated by horizontal arrow 725. FIG. 7A may represent a second transition and FIG. 7B may represent a first transition. These transitions, for example, are opposite in their direction of scrolling.

In some embodiments, the images displayed in FIG. 7B may pause at a specific location within display 705 prior to transitioning to the next image, and the images displayed in FIG. 7A may not pause at any location within display 710 prior to transitioning to the next image. In some embodiments, the images displayed in FIG. 7B may scroll slower than the images displayed in FIG. 7A. For example, images storage locally may scroll more slowly than the images being received from a remote storage location.

FIGS. 6A and 6B and FIGS. 7A and 7B are two examples of first transitions and second transitions that may be used in embodiments described herein. These transitions differ in direction of scrolling. Any other set of first transitions and second transitions may be used where at least one action may differ between the transitions.

Transitions may include any type of transition, such as, for example, scrolling vertically, scrolling horizontally, changes in the scrolling speed, changes in a sound played during scrolling, changes in the amount of time or whether the image pauses on the screen in between transitions, changes in whether the image is panned, changes in whether the image is zoomed, planning, swiping, etc.

In some embodiments, images stored locally may be selected randomly from the images storage locally prior to displaying the images. In some embodiments, the images being received at the image storage hub 500 from a remote storage location may be displayed in chronological order. In some embodiments, a subset the images being received at the image storage hub 500 from a remote storage location may be displayed rather than every image.

In some embodiments, the speed of the scrolling may differ. For example, the scrolling shown in FIGS. 6B and/or 7B may scroll more slowly than the images shown in FIGS. 6A and/or 7A.

FIG. 6A shows images 605, 606, 607 and 608 scrolling vertically from the top of the display 505 to the bottom of the display. The images move one after another across the display in any order. FIG. 6A may be a scrolling pattern for images being received from a remote location or recently received from a remote location (e.g., in less than the last 5 minutes). FIG. 6B shows images 609, 610, 611 and 612 scrolling vertically from the bottom of the display 505 to the top of the display. The images move one after another across the display in any order. FIG. 6B may be a scrolling pattern for images stored at a local storage location. Image 605 appears to be moving downwardly onto the display, and image 608 appears to moving upwardly off the display.

FIG. 6B shows a scrolling pattern that is different and/or opposite the scrolling pattern shown in FIG. 6A. Image 609 appears to be moving downwardly off the display, and image 612 appears to moving upwardly onto the display.

FIG. 7A shows images 710, 711, and 712 scrolling horizontally from the left of the display 505 to the right of the display. The images move one after another across the display in any order. FIG. 7A may be a scrolling pattern for images being received from a remote location or recently received from a remote location (e.g., in less than the last 5 minutes). FIG. 7B shows images 713, 714, and 715 scrolling horizontally from the right of the display 505 to the left of the display. The images move one after another across the display in any order. FIG. 7B may be a scrolling pattern for images stored at a local storage location. Image 710 appears to be moving onto the display, and image 712 appears to moving off the display.

FIG. 7B shows a scrolling pattern that is different and/or opposite the scrolling pattern shown in FIG. 7A. Image 715 appears to be moving onto the display, and image 713 appears to moving off the display.

In some embodiments, one or more of images 605, 606, 607, 608, 609, 610, 611, 612, 710, 711, 712, 713, 714, and/or 715 may be a thumbnail image representation of an image stored locally or received from a remote device. In some embodiments, one or more of images 605, 606, 607, 608, 609, 610, 611, 612, 710, 711, 712, 713, 714, and/or 715 may have different aspect ratios, dimensions, storage sizes, etc.

Figure 8:
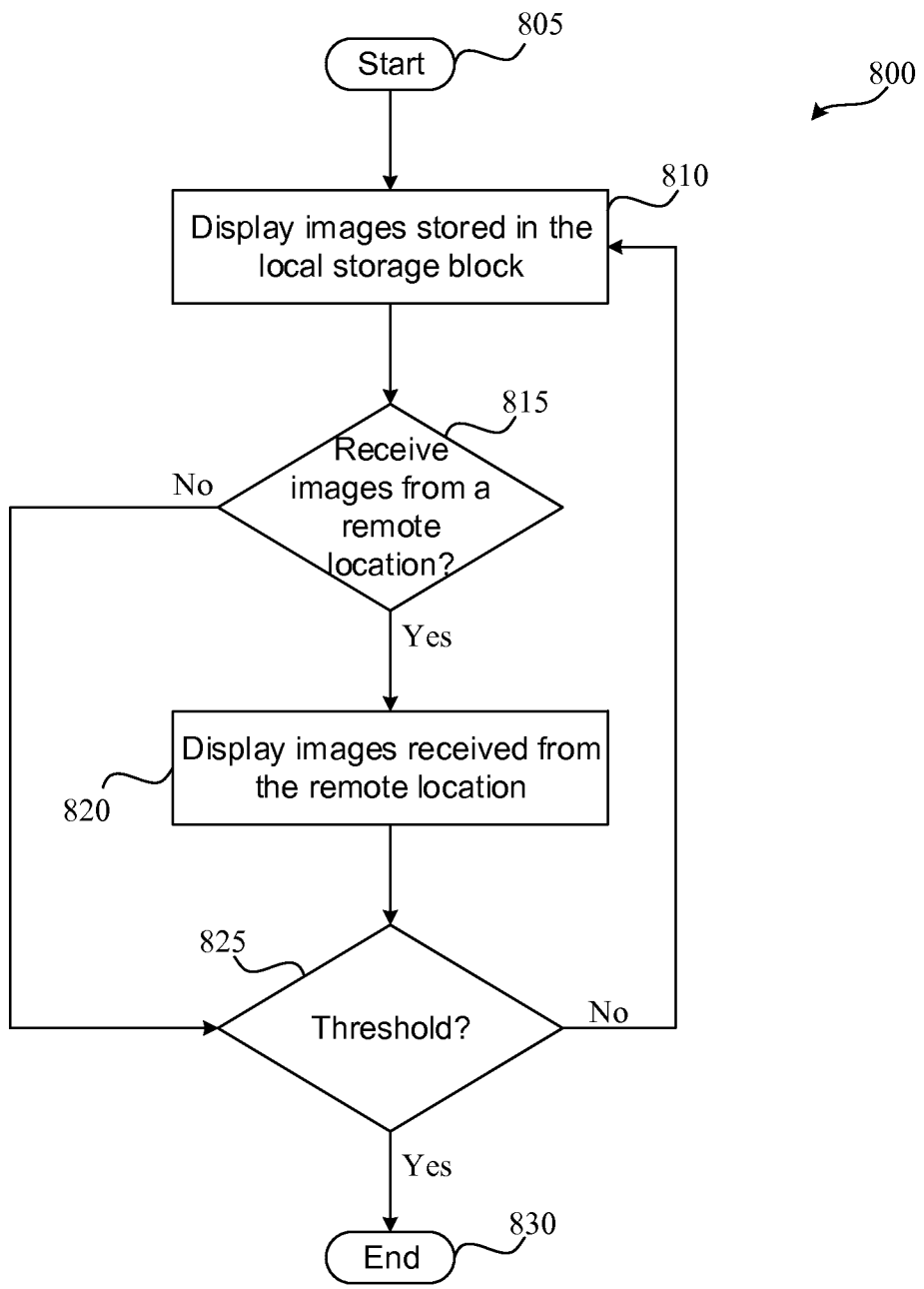
FIG. 8 is a flowchart of an example process for displaying images on a display according to at least one embodiment described herein FIG. 9

FIG. 8 is a flowchart of an example process 800 for displaying images on a display according to at least one embodiment described herein. One or more steps of the process 800 may be implemented, in some embodiments, by one or more components of the process 150 of Figures and 2 of devices 106 and/or storage manager device 114. Although illustrated as discrete blocks, various blocks may be divided into additional blocks, combined into fewer blocks, or eliminated, depending on the desired implementation.

The process 800 begins at block 805. At block 810 images stored in local storage (e.g., storage blocks 110) may be displayed on a display. The images may be displayed in a first scrolling pattern. For example, the first scrolling pattern may include displaying images one after another with a transition in between. A first image may move across a portion of the display from a first edge of the display to a second edge of the display and having an appearance such that the image appears to be moving off the display until the image appears to have been moved off the display. In some embodiments, the image may pause in its motion at some point on the display for a set period of time (e.g., 1, 5, 10 or more seconds). A second image may then move from the edge of the display as the first image moves toward the second edge of the display. Images may then move across the display one after another, and/or, possibly, pausing. The first scrolling pattern may include a transition that allows images to move across the display and/or pause at some point in their motion.

The images displayed at block 810 may be selected from the images in the local storage location based on any type of metadata included with the images. For example, the images may be displayed based on the date the images were captured, the faces in the images, the acceleration of the camera at or near the time the image was captured, the location where the image was captured, being labeled and/or tagged as favorites, the time and/or date the images were imported, etc.

At block 815 it may be determined whether images are being received from a remote location via one or more communication interfaces. If there are no images being received, then the process 800 may proceed to block 825. Otherwise, the process 800 moves to block 820.

At block 820 the images received from the remote location may be displayed on the display instead of and/or in place of the images from the local storage location. The images may be displayed in a second scrolling pattern that is different than the first scrolling pattern. For example, the second scrolling pattern may include displaying images one after another with a transition in between. For example, a first image may move across a portion of the display from the second edge of the display to the first edge of the display and having an appearance such that the image appears to be moving off the display until the image is no longer displayed. In some embodiments, the image may pause in its motion at some point on the display for a set period of time (e.g., 1, 5, 10 or more seconds). A second image may then move from the second edge of the display as the first image moves toward the first edge of the display. Images may move across the display one after another. The second scrolling pattern may include transition that allows images to move across the display and/or pause at some point in their motion.

In some embodiments the second scrolling pattern may move images across the screen more quickly than the first scrolling pattern. FIGS. 6A and 7A are examples of a second scrolling pattern and FIGS. 6B and 7B are examples of a first scrolling pattern. Alternatively, FIGS. 6B and 7B are examples of a second scrolling pattern and FIGS. 6A and 7A are examples of a first scrolling pattern.

Images received from the remote location may be continuously displayed until a threshold condition has been achieved at block 825. The threshold condition may include determining whether all the images received from the remote location have been displayed, a set period of time, whether a specific fraction of images have been displayed, etc. If the threshold condition has been met, then the process 800 may end at block 830. Otherwise the process may return to block 810.

Embodiments described herein may be used on any type of computational system including a standalone processing device such as a television, display, laptop, computer, etc. The computational system 900 (or processing unit) illustrated in FIG. 9 can be used to perform any of the embodiments of the invention. For example, the computational system 900 can be used alone or in conjunction with other components. As another example, the computational system 900 can be used to perform any calculation, solve any equation, perform any identification, and/or make any determination described here such as, for example, the process 800. The computational system 900 includes hardware elements that can be electrically coupled via a bus 905 (or may otherwise be in communication, as appropriate). The hardware elements can include one or more processors 910, including, without limitation, one or more general-purpose processors and/or one or more special-purpose processors (such as digital signal processing chips, graphics acceleration chips, and/or the like); one or more input devices 915, which can include, without limitation, a mouse, a keyboard, and/or the like; and one or more output devices 920, which can include, without limitation, a display, a printer, and/or the like.

The computational system 900 may further include (and/or be in communication with) one or more storage devices 925, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 900 might also include a communications subsystem 930, which can include, without limitation, a modem, a network card (wireless or wired), an infrared communication device, a wireless communication device, and/or chipset (such as a Bluetooth® device, a 802.6 device, a Wi-Fi device, a WiMAX device, cellular communication facilities, etc.), and/or the like. The communications subsystem 930 may permit data to be exchanged with a network (such as the network described below, to name one example) and/or any other devices described herein. In many embodiments, the computational system 900 will further include a working memory 935, which can include a RAM or ROM device, as described above.

The computational system 900 also can include software elements, shown as being currently located within the working memory 935, including an operating system 940 and/or other code, such as one or more application programs 945, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 925 described above.

In some cases, the storage medium might be incorporated within the computational system 900 or in communication with the computational system 900. In other embodiments, the storage medium might be separate from the computational system 900 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 900 and/or might take the form of source and/or installable code, which, upon compilation and/or installation on the computational system 900 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. An image storage hub comprising:
a display;
a local storage location;
a communication interface; and a processor communicatively coupled with the display, the local storage location, and the communication interface, wherein the processor is configured to:

retrieve a first plurality of images from the local storage location;

display each image of the first plurality of images on the display with a first transition between consecutively displayed images of the first plurality of images, the first plurality of images displayed with the first transition based on the first plurality of images being stored on the local storage location;

receive a second plurality of images from a remote storage location through the communication interface; and display each image of the second plurality of images on the display of the image storage hub with a second transition between consecutively displayed images of the second plurality of images, the second transition being different than the first transition and the second plurality of images displayed with the second transition based on the second plurality of images being stored on the remote storage location.

2. The image storage hub according to claim 1, wherein the first transition comprises displaying each image of the first plurality of images in motion moving from a first side of the display to a second side of the display, and wherein the second transition comprises displaying each image of the second plurality of images in motion moving from the second side of the display to the first side of the display.

3. The image storage hub according to claim 1, wherein the first transition comprises displaying each image of the first plurality of images in motion at a first rate, and wherein the second transition comprises displaying each image of the second plurality of images in motion at a second rate that is faster than the first rate.

4. The image storage hub according to claim 1, wherein the communication interface comprises an interface selected from the group consisting of a USB connection, a network connection, a Bluetooth interface, and a Wi-Fi interface.

5. The image storage hub according to claim 1, wherein the second plurality of images comprises a subset of a plurality of images being received from the remote storage location through a communication interface of the image storage hub.

6. The image storage hub according to claim 1, wherein the first transition comprises displaying each image of the first plurality of images in motion, and wherein each image of the first plurality of images is displayed without being in motion for a set period of time.

7. The image storage hub according to claim 1, wherein the local storage location comprises a disk drive, a drive array, an optical storage device, a solid-state storage device and the remote storage locations comprise one or more of a disk drive, a flash drive, a Universal Serial Bus (USB) storage device, and a Secure Digital (SD) card.

8. The image storage hub according to claim 1, further comprising one or more of a cloud storage service and a glacial storage system.

9. A non-transitory computer-readable medium having encoded therein programming code executable by a processor of an image storage hub to perform operations comprising:

retrieving a first plurality of images from a local storage location at the image storage hub;

displaying each image of the first plurality of images on a display of the image storage huh with a first transition between consecutively displayed images of the first plurality of images, first plurality of images displayed with the first transition based on the first plurality of images being stored on the local storage location;

receiving a second plurality of images from a remote storage location through a communication interface of the image storage hub; and displaying each image of the second plurality of images on the display of the image storage hub with a second transition between consecutively displayed images of the second plurality of images, the second transition being different than the first transition and the second plurality of images displayed with the second transition based on the second plurality of images being stored on the remote storage location.

10. The non-transitory computer-readable medium according to claim 9, wherein the first transition comprises displaying each image of the first plurality of images in motion moving from a first side of the display to a second side of the display, and wherein the second transition comprises displaying each image of the second plurality of images in motion moving from the second side of the display to the first side of the display.

11. The non-transitory computer-readable medium according to claim 9, wherein the first transition comprises displaying each image of the first plurality of images in motion at a first rate, and wherein the second transition comprises displaying each image of the second plurality of images in motion at a second rate that is faster than the first rate.

12. The non-transitory computer-readable medium according to claim wherein the communication interface comprises an interface selected from the group consisting of a USB connection, a network connection, a Bluetooth interface, and a Wi-Fi interface.

13. The non-transitory computer-readable medium according to claim 9, wherein the second plurality of images comprises a subset of a plurality of images being received from the remote storage location through a communication interface of the image storage hub.

14. The non-transitory computer-readable medium according to claim 9, wherein the first transition comprises displaying each image of the first plurality of images in motion, and wherein each image of the first plurality of images is displayed without being in motion for a set period of time.

15. A method executing on an image storage hub comprising a memory with a local storage location, a processor; a network interface, and a display, the method comprising:

retrieving a first plurality of images from the local storage location;

displaying each image of the first plurality of images on the display of the image storage hub with a first transition between consecutively displayed images of the first plurality of images, the first plurality of images displayed with the first transition based on the first plurality of images being stored on the local storage location;

receiving a second plurality of images from a remote storage location through the network interface; and displaying each image of the second plurality of images on the display of the image storage hub with a second transition between consecutively displayed images of the second plurality of images, the second transition being different than the first transition and the second plurality of images displayed with the second transition based on the second plurality of images being stored on the remote storage location.

16. The method according to claim 15, wherein the first transition comprises displaying each image of the first plurality of images in motion moving from a first side of the display to a second side of the display, and wherein the second transition comprises displaying each image of the second plurality of images in motion moving from the second side of the display to the first side of the display.

17. The method according to claim 15, wherein the first transition comprises displaying each image of the first plurality of images in motion at a first rate, and wherein the second transition comprises displaying each image of the second plurality of images in motion at a second rate that is faster than the first rate.

18. The method according to claim 15, wherein the communication interface comprises an interface selected from the group consisting of a USB connection; a network connection, a Bluetooth interface; and a Wi-Fi interface.

19. The method according to claim 15, wherein the second plurality of images comprises a subset of a plurality of images being received from the remote storage location through a communication interface of the image storage hub.

20. The method according to claim 15, wherein the first transition comprises displaying each image of the first plurality of images in motion, and wherein each image of the first plurality of images is displayed without being in motion for a set period of time.

* * * * *